United States Patent
Falkowski et al.

(10) Patent No.: US 12,227,526 B2
(45) Date of Patent: *Feb. 18, 2025

(54) METAL-ORGANIC FRAMEWORK MATERIALS COMPRISING A DIIMINE SCAFFOLD AND METHODS FOR PRODUCTION THEREOF

(71) Applicant: ExxonMobil Technology and Engineering Company, Annandale, NJ (US)

(72) Inventors: Joseph M. Falkowski, Hampton, NJ (US); Carter W. Abney, Califon, NJ (US); Mary S. Abdulkarim, Palisades Park, NJ (US); Aaron Sattler, Annandale, NJ (US); Michele Paccagnini, Randolph, NJ (US); Simon C. Weston, Annandale, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 579 days.

This patent is subject to a terminal disclaimer.

(21) Appl. No.: 17/310,622

(22) PCT Filed: Mar. 30, 2020

(86) PCT No.: PCT/US2020/025652
§ 371 (c)(1),
(2) Date: Aug. 13, 2021

(87) PCT Pub. No.: WO2020/205699
PCT Pub. Date: Oct. 8, 2020

(65) Prior Publication Data
US 2022/0153757 A1 May 19, 2022

Related U.S. Application Data

(60) Provisional application No. 62/964,251, filed on Jan. 22, 2020, provisional application No. 62/827,443, filed on Apr. 1, 2019.

(51) Int. Cl.
| | |
|---|---|
| *C07F 3/06* | (2006.01) |
| *C01B 37/00* | (2006.01) |
| *C01B 39/00* | (2006.01) |
| *C07F 3/00* | (2006.01) |
| *C07F 3/02* | (2006.01) |
| *C07F 15/04* | (2006.01) |
| *C07F 15/06* | (2006.01) |
| *C07F 19/00* | (2006.01) |

(52) U.S. Cl.
CPC ............... *C07F 3/06* (2013.01); *C01B 37/00* (2013.01); *C01B 39/00* (2013.01); *C07F 3/003* (2013.01); *C07F 3/02* (2013.01); *C07F 15/045* (2013.01); *C07F 15/065* (2013.01); *C07F 19/005* (2013.01)

(58) Field of Classification Search
CPC .... B01J 31/1691; B01J 31/1815; C07F 3/003; C07F 15/045; C07F 15/065; C07F 19/005
See application file for complete search history.

(56) References Cited

U.S. PATENT DOCUMENTS

| | | | |
|---|---|---|---|
| 2017/0073364 | A1 | 3/2017 | Dinca et al. |
| 2018/0250664 | A1 | 9/2018 | Dinca et al. |
| 2022/0169663 | A1* | 6/2022 | Falkowski .............. C01B 37/00 |

FOREIGN PATENT DOCUMENTS

WO  WO2020/205699  10/2020

OTHER PUBLICATIONS

Yang, Ying, et al. ChemCatChem 2015, 7, 3454-3459. (Year: 2015).*
Z. Yin et al., 378 Coordination Chemistry Reviews, 500-512 (2019) (Year: 2019).*
Z. Bao et al., 9 Energy and Environmental Science, 3612-3641 (2016) (Year: 2016).*
J. Liu et al., 46 Chem. Soc. Rev., 5730-5770 (2017) (Year: 2017).*
New Members of the Periodic Table. 40-41 (2017) (Year: 2017).*
M. Ahamad et al., 49 Dalton Transactions, 14690-14705 (2020) (Year: 2020).*
B. Bueken, et al. 19 CrystEngComm 4152-4156 (2017) (Year: 2017).*
S. Yuan, et al., 4 ACS central science 440-450 (2018) (Year: 2018).*
X. Zhang, et al., 46 Dalton Transactions, 2332-2338 (2017) (Year: 2017).*
Q. Xia et al., 15 Nano Micro Small, 1-25 (Jan. 2019) (Year: 2019).*
M. Van Vleet, 118 Chemical Reviews, 3681-3721 (2018) (Year: 2018).*

* cited by examiner

*Primary Examiner* — Alexander R Pagano
*Assistant Examiner* — Frank S. Hou
(74) *Attorney, Agent, or Firm* — Shook, Hardy & Bacon L.L.P.

(57) ABSTRACT

Metal-organic framework materials (MOFs) are highly porous entities comprising a multidentate organic ligand coordinated to multiple metal centers, typically as a coordination polymer. Crystallization may be problematic in some instances when secondary binding sites are present in the multidentate organic ligand. Multidentate organic ligands comprising first and second binding sites bridged together with a third binding site comprising a diimine moiety may alleviate these issues, particularly when using a preformed metal cluster as a metal source to form a MOF. Such MOFs may comprise a plurality of metal centers, and a multidentate organic ligand coordinated to the plurality of metal centers to define an at least partially crystalline network structure having a plurality of internal pores, and in which the multidentate organic ligand comprises first and second binding sites bridged together with a third binding site comprising a diimine moiety. Particular MOFs may comprise N,N'-di(1H-pyrazol-4-yl)ethane-1,2-diimine as a multidentate organic ligand.

39 Claims, 10 Drawing Sheets

METAL-ORGANIC FRAMEWORK MATERIALS COMPRISING A DIIMINE SCAFFOLD AND METHODS FOR PRODUCTION THEREOF

CROSS-REFERENCE TO RELATED APPLICATIONS

This application is a national stage application under 35 USC 371 of International Application No. PCT/US2020/025652 filed on Mar. 30, 2020, which claimed the benefit of U.S. Provisional Patent Application No. 62/827,443 filed Apr. 1, 2019 and Application No. 62/964,251 filed Jan. 22, 2020.

FIELD OF THE INVENTION

The present disclosure relates to metal-organic framework materials formed from multidentate organic ligands comprising a diimine scaffold.

BACKGROUND

Metal-organic framework materials (MOFs) are a relatively new class of highly porous network materials having potential applications in a wide range of fields including gas storage, gas and liquid separations, isomer separation and resolution, waste treatment, and catalysis, among others. In contrast to zeolites, which are purely inorganic in character, MOFs comprise multidentate organic ligands that function as "struts" bridging metal atoms or clusters of metal atoms together in an extended coordination network structure (e.g., as a coordination polymer). Like zeolites, MOFs are microporous and exhibit a range of structures, including a tunable pore shape and/or size through selection of the multidentate organic ligand and the metal or metal source.

Because organic ligands may be readily modified, MOFs exhibit a much greater breadth of structural diversity than is found for zeolites. Indeed, tens of thousands of MOF structures are now known, compared to only a few hundred unique zeolite structures. Factors that may influence the structure of MOFs include, for example, one or more of ligand denticity, size and type of the binding site(s) (coordinating group(s)), additional substitution remote or proximate to the binding site(s), ligand size and geometry, ligand hydrophobicity or hydrophilicity, ligand flexibility, choice of metal(s) and/or metal source(s), choice of solvent(s), and reaction conditions such as temperature, concentration, and the like.

Although there is nearly unlimited structural diversity available for multidentate organic ligands, it is not a foregone conclusion that a given multidentate organic ligand will necessarily form a MOF when combined with a particular metal source. The multiple binding sites in multidentate organic ligands may either contribute to structure formation or be non-structural in nature. Multidentate organic ligands containing secondary binding sites that do not contribute to structure formation (orthogonal binding sites) may make crystallization of MOFs very difficult to realize. Secondary binding sites may interact with metal centers coordinated to a structural binding site, thereby interrupting nucleation and growth of the network structure needed to define the MOF. As a result, multidentate organic ligands employed for MOF syntheses are often designed with structural rigidity in mind to maintain the binding sites in a defined geometry. Alternative approaches may include protecting the secondary binding sites from participating in crystal growth, isolating hard and soft ligands at structural and secondary binding sites, introducing secondary binding sites through post-synthetic functionalization following MOF formation, or excluding secondary binding sites altogether. Both situations limit the range of MOF network structures that might otherwise be synthesized. In addition, some multidentate organic ligands potentially suitable for forming MOFs may be difficult and/or expensive to synthesize, thereby limiting practical access to MOFs potentially having designed structures for use in specific applications, such as catalysis. Multidentate organic ligands having secondary binding sites are often particularly difficult and expensive to produce.

SUMMARY

In some embodiments, the present disclosure provides metal-organic framework materials comprising a plurality of metal centers and a multidentate organic ligand coordinated to the plurality of metal centers via at least one binding site to define an at least partially crystalline network structure having a plurality of internal pores. The multidentate organic ligand comprises a first binding site and a second binding site that are bridged together with a third binding site, the third binding site comprising a diimine moiety that is a reaction product of glyoxal.

More specific embodiments of metal-organic framework materials may comprise a plurality of metal centers, and a multidentate organic ligand coordinated to the plurality of metal centers via at least one binding site to define an at least partially crystalline network structure having a plurality of internal pores. The multidentate organic ligand comprises a first binding site and a second binding site each comprising a pyrazole or a salicylate that are bridged together with a third binding site comprising a diimine moiety.

Still more specific embodiments of metal-organic framework materials may comprise a plurality of divalent metal centers, and an N,N'-di(1H-pyrazol-4-yl)ethane-1,2-diimine multidentate organic ligand coordinated to the plurality of divalent metal centers via at least one binding site to define an at least partially crystalline network structure having a plurality of internal pores.

Other more specific embodiments of metal-organic framework materials may comprise a plurality of divalent metal centers, and a 5,5'-(((1E,2E)-ethane-1,2-diylidene)bis(azaneylylidene))bis(2-hydroxybenzoic acid) multidentate organic ligand coordinated to the plurality of divalent metal centers via at least one binding site to define an at least partially crystalline network structure having a plurality of internal pores.

In some or other embodiments, methods for synthesizing metal-organic framework materials may comprise: combining a metal source with a multidentate organic ligand comprising a first binding site and a second binding site that are bridged together with a third binding site, the third binding site comprising a diimine moiety that is a reaction product of glyoxal; and reacting the metal source with the multidentate organic ligand to form a metal-organic framework material having an at least partially crystalline network structure with a plurality of internal pores defined therein and comprising a plurality of metal centers coordinated to at least one of the first binding site, the second binding site, or the third binding site.

More specific embodiments of methods for synthesizing metal-organic framework materials may comprise: combining a metal source with a multidentate organic ligand comprising N,N'-di(1H-pyrazol-4-yl)ethane-1,2-diimine, and reacting the metal source with the multidentate organic ligand to form a metal-organic framework material having an at least partially crystalline network structure with a plurality of internal pores defined therein and comprising a plurality of metal centers coordinated to the multidentate organic ligand at one or more binding sites.

Still other more specific methods for synthesizing metal-organic framework materials may comprise: combining a metal source with a multidentate organic ligand comprising 5,5'-(((1E,2E)-ethane-1,2-diylidene)bis(azaneylylidene))bis (2-hydroxybenzoic acid); and reacting the metal source with the multidentate organic ligand to form a metal-organic framework material having an at least partially crystalline network structure with a plurality of internal pores defined therein and comprising a plurality of metal centers coordinated to the multidentate organic ligand at one or more binding sites.

In still other embodiments, the present disclosure provides catalytic methods. The catalytic methods comprise: providing a catalyst precursor comprising a reaction product of N,N'-di(1H-pyrazol-4-yl)ethane-1,2-diimine and a preformed zinc cluster, ZnO, or basic zinc carbonate, the reaction product being a metal-organic framework material having an at least partially crystalline network structure with a plurality of internal pores defined therein and comprising a plurality of metal centers comprising zinc coordinated to at least one binding site in the N,N'-di(1H-pyrazol-4-yl) ethane-1,2-diimine; exposing the catalyst precursor to an activator to form an activated catalyst; contacting the activated catalyst with an olefin; and oligomerizing the olefin while the olefin contacts the activated catalyst.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

FIG. 2-2 shows comparative X-ray powder diffraction patterns for the products obtained in Examples 2A, 2E, and 5.

DETAILED DESCRIPTION

Figure 1:
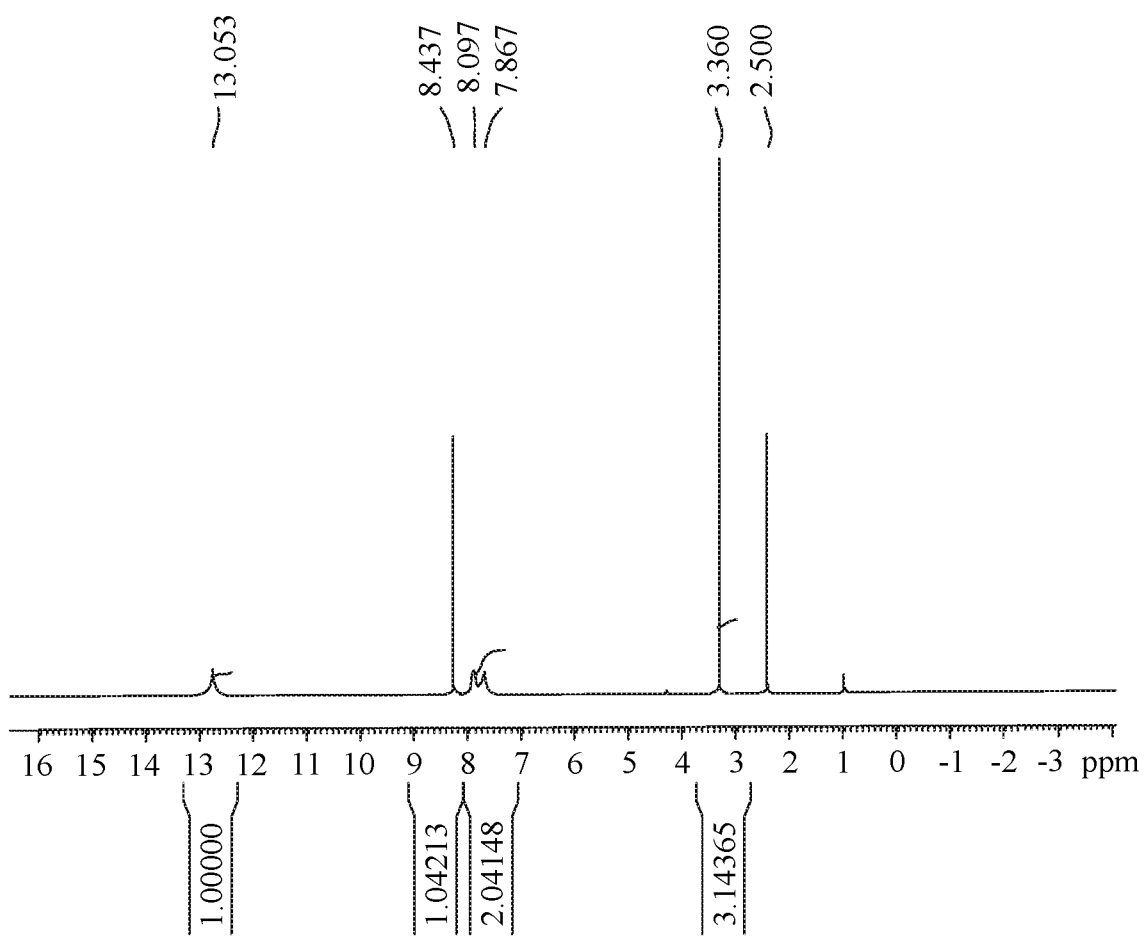
FIG. 1 shows a $^1$H NMR spectrum of N,N'-di(1H-pyrazol-4-yl)ethane-1,2-diimine.

The present disclosure generally relates to metal-organic framework materials and, more specifically, to metal-organic framework materials formed from multidentate organic ligands comprising a diimine scaffold and methods for production and use thereof.

As discussed in brief above, metal-organic framework materials (MOFs) may be synthesized by reacting a multidentate organic ligand with a suitable metal source to form a crystalline or partially crystalline network structure having a plurality of internal pores. The network structure may constitute a coordination polymer in some instances. Although a wide breadth of multidentate organic ligands may be produced synthetically, the syntheses may be difficult or expensive to perform in some cases, thereby limiting access to the corresponding metal-organic framework materials in practically useful quantities. Moreover, certain types of multidentate organic ligands do not afford ready formation of an extended network structure defining a metal-organic framework material when exposed to a metal source. Metal-organic framework materials may be particularly difficult to produce when using multidentate organic ligands containing orthogonal (different types of) binding sites that may be present as secondary binding sites. Namely, orthogonal binding sites may interact with other metal binding sites, such as structural binding sites, thereby hampering formation and/or crystallization of a metal-organic framework material.

The present disclosure provides a diverse class of multidentate organic ligands having orthogonal structural binding sites that may react readily with an array of metal sources to afford at least partially crystalline metal-organic framework materials having a range of structural and morphological properties. Advantageously, the multidentate organic ligands disclosed herein may be accessed through facile syntheses to afford various orthogonal binding sites upon a spacer group (bridging group) also containing a binding site. In particular, the present disclosure describes multidentate organic ligands comprising a diimine moiety as a binding site that also bridges together at least two additional binding sites of one or more different types (i.e., non-diimine binding sites), in which the orthogonal binding sites may be introduced readily using various organic synthons bearing an amine moiety. The organic synthons bear functionality suitable for coordinating a metal center once the diimine moiety has been formed (i.e., after reacting the organic synthon with a vicinal dialdehyde such as glyoxal or other reactive vicinal dicarbonyl compound, such as a vicinal diketone or a vicinal ketoaldehyde). Once bound to the diimine moiety, the orthogonal binding sites remain appropriately positioned for coordinating one or more metal centers, but without promoting detrimental interactions of the orthogonal binding sites with the metal center at the binding site defined by the diimine moiety. Surprisingly, the multidentate organic ligands described herein may afford structurally related network structures having differing crystallinity and/or morphological properties (or different network structures altogether) depending upon the metal source used and/or the reaction conditions under which the metal-organic framework material is formed. The extent of crystallinity may be assayed by X-ray powder diffraction in particular embodiments.

In particular embodiments, the multidentate organic ligands disclosed herein may be readily synthesized by reacting glyoxal (1,2-ethanedicarboxaldehyde) or a similar 1,2-dicarbonyl compound (vicinal dicarbonyl compound) with an organic synthon bearing an amine group that is reactive with the aldehyde groups or similar carbonyl moiety along with suitable functionality for coordinating a metal center (e.g., another heteroatom or group of heteroatoms). In particular implementations of the present disclosure, a suitable multidentate organic ligand may be synthesized by reacting glyoxal and 4-aminopyrazole with one another, thereby forming N,N'-di(1H-pyrazol-4-yl)ethane-1,2-diimine. In other particular implementations of the present disclosure, a suitable multidentate organic ligand may be synthesized by reacting glyoxal and 5-aminosalicylic acid, thereby forming 5,5'-(((1E,2E)-ethane-1,2-diylidene)bis(azaneylylidene))bis(2-hydroxybenzoic acid). As discussed further herein, these multidentate organic ligands may react with various metal sources to form metal-organic framework materials having a breadth of structural and morphological diversity.

Surprisingly, N,N'-di(1H-pyrazol-4-yl)ethane-1,2-diimine and similar multidentate organic ligands bearing a linking diimine moiety may form metal-organic framework materials having different extents of crystallinity and/or variable network structures depending upon the metal source that is used. In some instances, a preformed metal cluster, such as $Zn_4O(2,2\text{-dimethylbutanote})_6$ ($Zn_4O(DMBA)_6$) or similar metal carboxylate clusters, may be particularly suitable for reaction with the foregoing types of multidentate organic ligands to form metal-organic framework materials. Other suitable examples of preformed metal clusters that may be suitable include other branched or unbranched acid metal clusters, including $Zn_4O(acetate)_6$, $Zn_4O(benzoate)_6$ or zinc amidate clusters. Without being bound by any theory or mechanism, it is believed that preformed metal clusters of these types may preclude a substantial interaction from occurring between a metal center coordinated at the diimine binding site and unbound orthogonal binding sites, such as the pyrazolate groups in N,N'-di(1H-pyrazol-4-yl)ethane-1, 2-diimine. As such, preformed metal clusters of these types may promote formation of metal-organic framework materials having high crystallinity and internal porosity, in which the diimine binding sites and the orthogonal binding sites are bound to separate metal centers. While preformed metal clusters may be particularly desirable metal sources for promoting formation of metal-organic framework materials, other metal sources may also satisfactorily form structurally related metal-organic framework materials that may result from structural flexibility when different metal sources are used. The ability of the multidentate organic ligands described herein to form various structurally related metal-organic framework materials is believed to result from structural flexibility of the resulting framework structure, while still positioning the orthogonal binding sites effectively to promote coordination of a metal center remote from a metal center coordinated to the diimine moiety.

Additional tailoring of the structural morphology may be realized by combining an acid with the metal source during the synthesis, particularly when employing a metal source that is not a preformed metal cluster. For example, a metal source, such as zinc oxide, basic zinc carbonate, or zinc acetate, may be combined with an acid such as nitric acid or hydrochloric acid or a ligand, such as 2,2-dimethylbutanoic acid or other carboxylic acid capable of coordinating the metal source, without forming a preformed metal cluster, while still benefiting the synthesis. The combination of the metal source and the carboxylic acid may undergo a reaction with a multidentate organic ligand to form a metal-organic framework material of the present disclosure without a preformed metal cluster being present. Advantageously, the presence of the acid or similar entity may increase the pore size resulting in the metal-organic framework material. Without being bound by theory or mechanism, the acid is believed to serve as a mineralization aid during the synthesis.

Ligands associated with a preformed metal cluster or other metal source may remain within the internal pores of the metal-organic framework material after its formation in some cases. Similarly, ligands used in free form (e.g., exogenously as a mineralization aid) with a metal salt, such as zinc oxide or basic zinc carbonate, may likewise remain within the internal pores after formation of the metal-organic framework material as well. Such ligands may be referred to as "residual ligands" herein. Again without being bound by any theory or mechanism, it is believed that by at least temporarily maintaining residual ligands within the internal pores of the metal-organic framework material, stabilization and rigidification of the network structure may be realized during and after synthesis thereof. Pore size improvement may also be realized. The effect of the residual ligands may be particularly pronounced when somewhat flexible metal-organic framework materials may be formed by a particular multidentate organic ligand. When metal-organic framework materials are synthesized without residual ligands being present, the morphology of the resulting network structure may be dictated largely by the structural flexibility of the multidentate organic ligand itself, thereby potentially leading to products having different crystallinity and/or structural morphology compared to that obtained when residual ligands are present. In this sense, the residual ligands may promote templated synthesis of the metal-organic framework materials. Although residual ligands such as carboxylic acids or carboxylate salts may undesirably occlude at least a portion of the internal pores within metal-organic framework materials synthesized using a preformed metal cluster, the residual ligands may be readily removed thermally and/or chemically from the metal-organic framework material to increase the available internal pore space within the network structure. Removal of residual ligands may be affected without substantially altering the structural features of the network structure.

In addition to the foregoing, metal-organic framework materials synthesized using the multidentate organic ligands described herein may undergo exchange with other metals to replace at least a portion of the metal atoms at the metal centers with one or more different metals. The one or more different metals may be introduced for any purpose, such as for conveying additional structural stabilization or for purposes of promoting a catalytic reaction. Minimal structural reorganization occurs when metal exchange takes place in many cases. Surprisingly, some of the metal-organic framework materials disclosed herein may be active for promoting catalytic reactions, such as olefin oligomerization, under suitable activation conditions, particularly after undergoing partial metal exchange or metal insertion at an open binding site. Double bond isomerization may be promoted by the metal-organic framework materials in some instances.

Before describing the various embodiments of the present disclosure in further detail, a listing of terms follows to aid in better understanding the present disclosure.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A", and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

As used in the present disclosure and claims, Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Cy is cyclohexyl, Oct is octyl, Ph is phenyl, and Bn is benzyl, and MAO is methylalumoxane.

The term "hydrocarbon" refers to a class of compounds having hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic, with optional substitution being present in some cases.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. Suitable "hydrocarbyl" and "hydrocarbyl groups" may be optionally substituted. The term "hydrocarbyl group having 1 to about 100 carbon atoms" refers to an optionally substituted moiety selected from a linear or branched $C_1$-$C_{100}$ alkyl, a $C_3$-$C_{100}$ cycloalkyl, a $C_6$-$C_{100}$ aryl, a $C_2$-$C_{100}$ heteroaryl, a $C_1$-$C_{100}$ alkylaryl, a $C_7$-$C_{100}$ arylalkyl, and any combination thereof.

The term "substituted" refers to replacement of at least one hydrogen atom or carbon atom of a hydrocarbon or hydrocarbyl group with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbons or hydrocarbyl groups include, but are not limited to, functional groups such as O, S, S=O, $S(=O)_2$, $NO_2$, F, Cl, Br, I, $NR_2$, OR, SeR, TeR, $PR_2$, $AsR_2$, $SbR_2$, SR, $BR_2$, $SiR_3$, $GeR_3$, $SnR_3$, $PbR_3$, where R is a hydrocarbyl group or H. Suitable hydrocarbyl R groups may include alkyl, alkenyl, alkynyl, aryl, heteroaryl, cycloalkyl, heterocyclyl, and the like, any of which may be optionally substituted.

The term "optionally substituted" means that a hydrocarbon or hydrocarbyl group may be unsubstituted or substituted. For example, the term "optionally substituted hydrocarbyl" refers to replacement of at least one hydrogen atom or carbon atom in a hydrocarbyl group with a heteroatom or heteroatom functional group. Unless otherwise specified, any of the hydrocarbyl groups herein may be optionally substituted.

The terms "linear" or "linear hydrocarbon" refer to a hydrocarbon or hydrocarbyl group having a continuous carbon chain without side chain branching, in which the continuous carbon chain may be optionally substituted.

The terms "cyclic" or "cyclic hydrocarbon" refer to a hydrocarbon or hydrocarbyl group having a closed carbon ring, which may be optionally substituted.

The terms "branched" or "branched hydrocarbon" refer to a hydrocarbon or hydrocarbyl group having a linear carbon chain or a closed carbon ring, in which a hydrocarbyl side chain extends from the linear carbon chain or the closed carbon ring. Optional substitution may be present in the linear carbon chain, the closed carbon ring, and/or the hydrocarbyl side chain.

The terms "saturated" or "saturated hydrocarbon" refer to a hydrocarbon or hydrocarbyl group in which all carbon atoms are bonded to four other atoms, with the exception of an unfilled valence position being present upon a carbon atom in a hydrocarbyl group.

The terms "unsaturated" or "unsaturated hydrocarbon" refer to a hydrocarbon or hydrocarbyl group in which one or more carbon atoms are bonded to less than four other atoms, exclusive of an open valence position upon carbon being present. That is, the term "unsaturated" refers to a hydrocarbon or hydrocarbyl group bearing one or more double and/or triple bonds, with the double and/or triple bonds being between two carbon atoms and/or between a carbon atom and a heteroatom.

The terms "aromatic" or "aromatic hydrocarbon" refer to a hydrocarbon or hydrocarbyl group having a cyclic arrangement of conjugated pi-electrons that satisfies the Hückel rule.

The term "alkyl" refers to a hydrocarbyl group having no unsaturated carbon-carbon bonds, and which may be optionally substituted.

The terms "alkene" and "olefin" are used synonymously herein. Similarly, the terms "alkenic" and "olefinic" are used synonymously herein. Unless otherwise noted, all possible geometric isomers are encompassed by these terms.

The term "aryl" is equivalent to the term "aromatic" as defined herein. The term "aryl" refers to both aromatic compounds and heteroaromatic compounds, which may be optionally substituted. Both mononuclear and polynuclear aromatic compounds are encompassed by these terms.

The terms "heteroaryl" and "heteroaromatic" refer to an aromatic ring containing a heteroatom and which satisfies the Hückel rule.

Examples of aromatic hydrocarbyl groups include, but are not limited to, phenyl, tolyl, xylyl, naphthyl, and the like. Heteroaryl and polynuclear heteroaryl groups may include, but are not limited to, pyridyl, quinolinyl, isoquinolinyl, pyrimidinyl, quinazolinyl, acridinyl, pyrazinyl, quinoxalinyl, imidazolyl, benzimidazolyl, pyrazolyl, benzopyrazolyl, oxazolyl, benzoxazolyl, isoxazolyl, benzisoxazolyl, imidazolinyl, thiophenyl, benzothiophenyl, furanyl and benzofuranyl. Polynuclear aryl groups may include, but are not limited to, naphthalenyl, anthracenyl, indanyl, indenyl, and tetralinyl.

As used herein, the term "multidentate" refers to a compound having two or more potential sites for coordinating a metal center. Accordingly, the term "mulidentate" encompasses bidentate, tridentate, tetradentate, and higher denticity ligands.

The term "metal center" refers to a single metal atom or metal ion, or a group (cluster) of metal atoms or metal ions to which a ligand is coordinatively bonded.

The term "preformed metal cluster" refers to a grouping of multiple metal atoms or metal ions and one or more ligands, in which the grouping is synthesized prior to being combined with another material to form a metal-organic framework material.

The term "diimine" refers to a chemical entity bearing a two carbon atoms that are singly bonded together, and each carbon atom is doubly bonded to a nitrogen atom. The two carbon atoms may be independently substituted with H and/or a hydrocarbyl group, wherein the substitution upon each carbon atom may be the same or different.

The term "at least partially crystalline" means that a substance exhibits an X-ray powder diffraction pattern.

The term "binding site" refers to a chemical entity capable of coordinating a metal center by a metal-ligand bond.

Accordingly, metal-organic framework materials of the present disclosure may comprise: a plurality of metal centers and a multidentate organic ligand coordinated to the plurality of metal centers via at least one binding site to define an at least partially crystalline network structure having a plurality of internal pores. The multidentate organic ligand comprises a first binding site and a second binding site that are bridged together with a third binding site, in which the third binding site comprises a diimine moiety, particularly a diimine moiety that is a reaction product of glyoxal. Such multidentate organic ligands may be referred to as "diimine ligands" or "diimine scaffolds" in the disclosure herein.

Formula 1 below shows the chemical structure of diimine ligands suitable for use in forming metal-organic framework materials according to the disclosure herein.

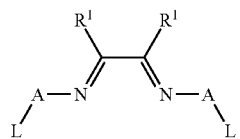

Formula 1

Referring to Formula 1, each $R^1$ is independently H or an optionally substituted hydrocarbyl group, wherein each occurrence of $R^1$ may be the same or different, A is an optional hydrocarbyl spacer that may be optionally substituted, wherein each occurrence of A may be the same or different, and each L is independently a functionality capable of coordinating a metal center (i.e., a ligand), which may be monodentate, bidentate, tridentate, or higher denticity, wherein each occurrence of L may be the same or different. Suitable hydrocarbyl groups that may be selected for $R^1$ include $C_1$-$C_{30}$ alkyl groups, $C_2$-$C_{30}$ alkenyl or alkynyl groups, $C_3$-$C_{30}$ cycloalkyl groups, $C_4$-$C_{10}$ aromatic or heteroaromatic groups, or the like, any of which may be optionally substituted. Optionally, two $R^1$ groups may be joined together in Formula 1 to define a diimine having a cyclic structure. In particular embodiments, both occurrences of $R^1$ are not methyl groups. Diimine moieties that are a reaction product of glyoxal have both occurrences of $R^1$ as H. Diimine moieties that are a reaction product of a vicinal ketoaldehyde have one occurrence of $R^1$ as H and once occurrence of $R^1$ as a hydrocarbyl group. Diimine moieties that are a reaction product of a vicinal diketone have both occurrence of $R^1$ as hydrocarbyl groups, in which case each occurrence of $R^1$ may be the same for a symmetrical diketone or different for an unsymmetrical diketone.

In some examples, at least one of the first binding site and the second binding site comprise a pyrazole. In more particular examples, the first binding site and the second binding site in the metal-organic framework materials disclosed herein (i.e., each L in Formula 1) may be a pyrazole, which may optionally bear one or more hydrocarbyl or heteroatom substitutions and may be the same or different. In still more particular examples, the first binding site and the second binding site may each be an unsubstituted pyrazole. As used herein, the term "unsubstituted" means that a chemical entity, such as an aromatic or heteroaromatic ring like a pyrazole, bears hydrogen atoms at all valence positions other than a valence position through which the chemical entity is covalently bonded to the diimine moiety.

In more particular embodiments, the metal-organic framework materials described herein may feature a multidentate organic ligand in which hydrocarbyl spacer A is omitted, such that the diimine ligands have Formula 2, with the other variables being defined as above, and each occurrence of L and $R^1$ being the same or different.

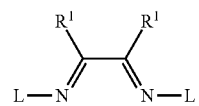

Formula 2

In still more particular examples, each L may be the same or different and independently be an aromatic, heterocyclic or heteroaromatic ring bearing one or more of a basic nitrogen atom (either exocyclic or endocyclic), a carboxylate, a phenoxide, a salicylate, a β-diketonate, an acetoacetonate, an oxalate, or a similar functionality capable of complexing a metal center. The functionality upon each L may complex a metal center in any manner including monodentate complexation, bidentate complexation, tridentate complexation, or higher denticity complexation. In still more specific examples, each L may independently be an imidazole, a pyrazole, a pyridine, a salicylate, a 1,2-dihydroxybenzene, a 1,2-benzenedicarboxylic acid, a 1,3-benzenedicarboxylic acid, or any combination thereof. Partially or fully reduced variants of the foregoing ligands are also encompassed by the present disclosure, such as dihydroimidazoles, tetrahydroimidazoles, dihydropyrazoles, tetrahydropyrazoles, dihydropyridines, tetrahydropyridines, and the like.

Accordingly, still more specific examples of multidentate organic ligands suitable for use in forming metal-organic framework materials according to the disclosure herein may have the structure of Formula 3A,

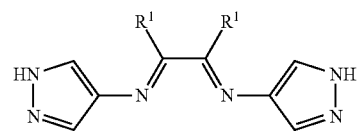

Formula 3A wherein each $R^1$ is independently selected as above and may be the same or different. Attachment of the imine nitrogen atoms at the other ring position of the pyrazole groups is also possible, as shown in Formula 3B.

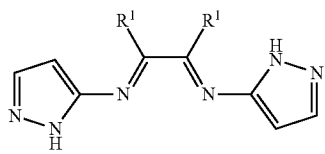

Formula 3B

In still more specific examples, each $R^1$ may be H, in which case the multidentate organic ligand is N,N'-di(1H-pyrazol-4-yl)ethane-1,2-diimine (Formula 4). This multidentate organic ligand may be formed by reacting glyoxal with 4-aminopyrazole.

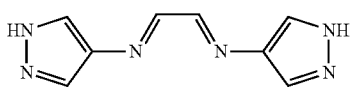

Formula 4

In another specific example, multidentate organic ligands suitable for forming metal-organic framework materials according to the disclosure herein may comprise salicylates as the selection for one or more occurrences of L, including instances where both occurrences of L are salicylates and the salicylates may be the same or different. Accordingly, certain multidentate organic ligands suitable for forming metal-organic framework materials according to the disclosure herein may have Formula 5A below, wherein $R^1$ is defined as above and each $R^1$ may be the same or different. In more particular embodiments, each occurrence of $R^1$ may be H.

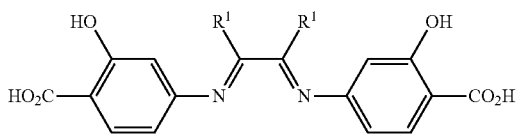

Formula 5A

Other possible regioisomers corresponding to the multidentate organic ligand of FIG. 5A are shown in FIGS. 5B-5D below, wherein each occurrence of $R^1$ may be the same or different.

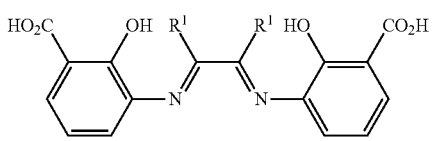

Formula 5B

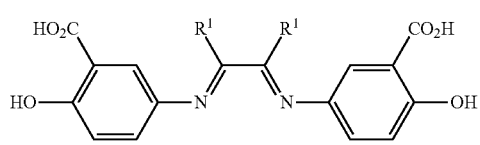

Formula 5C

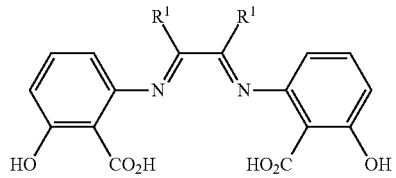

Formula 5D

Particular examples of suitable multidentate organic ligands corresponding to Formulas 5A-5D include 5,5'-(((1E,2E)-ethane-1,2-diylidene)bis(azaneylylidene))bis(2-hydroxybenzoic acid) and 4,4'-(((1E,2E)-ethane-1,2-diylidene)bis(azaneylylidene))bis(2-hydroxybenzoic acid).

Still other specific examples of multidentate organic ligands suitable for forming metal-organic framework materials according to the disclosure herein may comprise m-substituted benzenedicarboxylates as the selection for each L. Accordingly, certain multidentate organic ligands suitable for forming metal-organic framework materials according to the disclosure herein may have Formula 6 below, wherein $R^1$ may be selected independently as above and each occurrence of $R^1$ may be the same or different. In more specific examples, each occurrence of $R^1$ may be H in more specific embodiments.

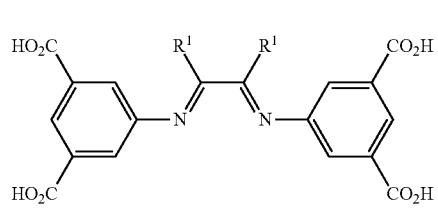

Formula 6

Again, other regioisomers are possible at attachment points for the imine nitrogen atoms upon the aromatic ring. A particular example of a suitable multidentate organic ligand corresponding to Formula 6 is 5,5'-(((1E,2E)-ethane-1,2-diylidene)bis(azaneylylidene))diisophthalic acid.

Other illustrative examples of ligands that may be suitably selected for one or more occurrences of L in the diimine ligands and corresponding metal-organic framework materials disclosed herein include, for example, 1,4-butanedicarboxylic acid, tartaric acid, glutaric acid, oxalic acid, 4-oxopyran-2, 6-dicarboxylic acid, 1,6-hexanedicarboxylic acid, decane dicarboxylic acid, 1,8-heptadecane dicarboxylic acid, 1,9-heptadecanedicarboxylic acid, heptadecanedicarboxylic acid, acetylene dicarboxylic acid, 1,2-benzenedicarboxylic acid, 2,3-pyridinedicarboxylic acid, 1,3-butadiene-1,4-dicarboxylic acid, 1,4-benzenedicarboxylic acid, 1,3-benzenedicarboxylic acid, imidazole-2,4-dicarboxylic acid, 2-methyl-quinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethan-3,3'-dicarboxylic acid, quinoline-3,4-dicarboxylic acid, 7-chloro-4-hydroxyquinoline-2,8-dicarboxylic acid, pyridine-2,6-dicarboxylic acid, 2-methylimidazole-4,5-dicarboxylic acid, thiophene-3,4-dicarboxylic acid, 2-isopropyl-4,5-dicarboxylic acid, tetrahydropyrane-4,4-dicarboxylic acid, perylene-3,9-dicarboxylic acid, polyethylenegylcol dicarboxylic acids, 3,6-dioxaoctanedicarboxylic acid, 3,5-cyclohexadiene-1,2-dicarboxylic acid, octanecarboxylic acid, pentane-3,3-carboxylic acid, 4,4'-diamino-1,1'-diphenyl-3,3'-dicarboxylic acid, 4,4'-diamino-diphenyl-3,3'-dicarboxylic acid, benzidine-3,3'-dicarboxylic acid, 1,4-bis-(phenylamino)-benzene-2,5-dicarboxylic acid, 1-1'-dinaphthyl-8,8'-dicarboxylic acid, 7-chloro-8-methylquinoline-2,3-dicarboxylic acid, 1-anilinoanthraquinone-2,4'-dicarboxylic acid, polytetrahydrofuran-2,5-dicarboxylic acid, 1,4-bis-(carboxymethyl)-piperazin-2,3-dicarboxylic acid, 7-chloroquinoline-3,8-dicarboxylic acid, 1-(4-carboxy)-phenyl-3-(4-chloro)-phenyl-pyrazolin-4,5-dicarboxylic acid, 1,4,5,6,7,7-hexachloro-5-norbornene-2,3-dicarboxylic acid, phenylindanedicarboxylic acid, 1,3-dibenzyl-2-oxo-imidazolidine-4,5-dicarboxylic acid, 1,4-cyclohexanedicarboxylic acid, naphthalene-1,8-dicarboxylic acid, 2-benzoylbenzol-1,3-dicarboxylic acid, 1,3-dibenzyl-2-oxo-imidazolidine-4,5-cis-dicarboxylic acid, 2,2'-biquinoline-4,4'-di-carboxylic acid, pyridine-3,4-dicarboxylic acid, 3,6,9-trioxaundecanedicarboxylic acid, hydroxy-benzophenone-dicarboxylic acids, pyrazole-3,4-dicarboxylic acid, 2,3-pyrazinedicarboxylic acid, 5,6-dimethyl-2,3-pyrazine dicarboxylic acid, 4,4'-diaminodiphenyl ether-di-imidedicarboxylic acid, 4,4'-diaminodiphenylmethanediimidedicarboxylic acid, 4,4'-diamino-diphenylsulfone diimidedicarboxylic acid, 2,6-naphthalene dicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenedioic acid, 8-sulfo-2,3-naphthalindicarboxylic acid, anthracene-2,3-dicarboxylic acid, 2',3'-diphenyl-p-terphenyl-4,4'-dicarboxylic acid, diphenyl-4,4'-dicarboxylic acid, imidazole-4,5-dicarboxylic acid, 4 (1H)-oxo-thiochromen-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontandicarboxylic acid, tetradecanedicarboxylic acid, 1,7-heptanedicarboxylic acid, 5-hydroxy-1,3-benzenedicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxy-diphenylmethane-3,3'-dicarboxylic acid, 1-amino-4-methyl-9,10-dioxo-9,10-dihydroanthracene-2.3-dicarboxylic acid, 2,5-pyridinedicarboxylic acid, cyclohexene-2,3-dicarboxylic acid, 2,9-dichlorfluorubin-4,11-dicarboxylic acid, 7-chloro-3-methylquinoline-6,8-dicarboxylic acid, 2,4-dichlorobenzophenone-2'5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecane-5,6-dehydronorbornan-2,3-dicarboxylic acid, 5-ethyl-2,3-pyridinedicarboxylic acid, 2-hydroxy-1,2,3-propanetricarboxylic acid, 7-chloro-2,3,8-quinolinetricarboxylic acid, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propane-4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid, aurinetricarboxylic acid, 1,1-dioxide-perylo[1,12-BCD]thiophene-3,4,9,10-tetracarboxylic acid, perylenetetracarboxylic acids, perylene-3,4,9,10-tetracarboxylic acid, perylene-1,12-sulfone-3,4,9,10-tetracarboxylic acid, butanetetracarboxylic acids, 1,2,3,4-butanetetracarboxylic acid, meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofilrantetracarboxylic acid, cyclopentanetetracarboxylic acids such as cyclopentane-1,2,3,4-tetracarboxylic acid, imidazoles such as 2-methyl-imidazole, acetylenedicarboxylic acid, camphordicarboxylic acid, fumaric acid, succinic acid, benzenedicarboxylic acids such as phthalic acid, isophthalic acid, terephthalic acid, aminoterephthalic acid, triethylenediamine, methylglycinediacetic acid, naphthalenedicarboxylic acids, biphenyldicarboxylic acids such as 4,4'-biphenyldicarboxylic acid, pyrazinedicarboxylic acids such as 2,5-pyrazinedicarboxylic acid, bipyridinedicarboxylic acids such as 2,2'-bipyridinedicarboxylic acids, including 2,2'-bipyridine-5,5'-dicarboxylic acid, benzenetricarboxylic acids, including 1,2,3-benzenetricarboxylic acid, 1,2,4-benzenetricarboxylic acid or 1,3,5-benzenetricarboxylic acid, benzenetetracarboxylic acids, adamantanetetracarboxylic acid, adamantanedibenzoate, benzenetribenzoate, methanetetrabenzoate, adamantanetetrabenzoate, dihydroxyterephthalic acids such as 2,5-dihydroxyterephthalic acid, tetrahydropyrene-2,7-dicarboxylic acid, biphenyltetracarboxylic acid, and 1,3-bis(4-pyridyl)propane. The numbering convention used in the foregoing list is based upon the IUPAC naming convention for the parent ligand. It is to be appreciated that the numbering convention may change upon incorporating the foregoing ligands into a multidentate organic ligand comprising a diimine. One having ordinary skill in the art may envision suitable organic synthons featuring these and similar ligands so as to promote attachment onto a diimine linker, either directly or indirectly (e.g., by bonding through spacer group A).

The identity of the metal centers that may be present in the metal-organic framework materials disclosed herein is not considered to be particularly limited. In some embodiments, at least a portion of the plurality of metal centers may comprise a divalent metal. Trivalent metals may also be suitably included, either alone or in combination with one or more divalent metals. Suitable divalent metals that may be present in the metal-organic framework materials disclosed herein include, for example, zinc, cobalt, nickel, or any combination thereof. In other particular embodiments, the plurality of metal centers may comprise a metal selected from among magnesium, manganese, chromium, iron, copper, cobalt, nickel, zinc, or any combination thereof, any of which may be divalent. The metal(s) located in the plurality of metal centers may be introduced when reacting a suitable metal source with the multidentate organic ligands disclosed above, or at least a portion of the metal(s) in the metal centers may be introduced via an exchange reaction after forming the at least partially crystalline network structure defining the metal-organic framework material. The metal centers may be present in any form including, but not limited to, discrete metal cations, metal clusters, metal chains, or any combination thereof.

In some embodiments, suitable metal salts that may be used to form metal-organic framework materials according to the disclosure herein include metal ions such as, but not limited to, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Ti^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$ and $Bi^{+}$. Other oxidation states of these metal ions may also be suitably used in some instances. Depending on the identity of the multidentate organic ligand and the conditions under which the metal-organic framework material is formed, suitable counterion forms for the metal ions may include, but are not limited to, nitrate, nitrite, sulfate, hydrogen sulfate, oxide, acetate, formate, oxide, hydroxide, benzoate, alkoxide, carbonate, acetylacetonate, hydrogen carbonate, fluoride, chloride, bromide, iodide, phosphate, hydrogen phosphate, dihydrogen phosphate, or the like. When forming a metal-organic framework material using a metal salt, including metal oxides and the like, it may be desirable to include a mineralization aid, such as a carboxylic acid or a mineral acid, in the synthesis to promote formation of higher pore volumes, for example. In a particular example, it may be desirable to combine a carboxylic acid with zinc oxide when synthesizing metal-organic framework materials using the multidentate organic ligands disclosed herein.

In other particular examples, a preformed metal cluster may comprise a suitable metal source for forming the metal-organic framework materials disclosed herein. As referenced above, preformed metal clusters may particularly facilitate crystallization of the metal-organic framework materials, possibly by precluding coordination of the orthogonal binding sites at the structural binding sites. Although preformed metal clusters may be particularly desirable for use in forming the metal-organic framework materials of the present disclosure, it is to be appreciated that common metal salts may be suitable in certain instances as well, as specified above. For example, metal oxides, basic metal carbonates, and metal carboxylates (e.g., metal acetates) may also be suitably used to form metal-organic framework materials having a network structure related to that produced when using a preformed metal cluster. Determination of the presence of a network structure and crystallinity thereof, including a determination of whether a particular network structure is related to another network structure, may be performed by X-ray powder diffraction, as described elsewhere herein.

Preformed metal clusters may feature one or more ligands that stabilize the grouping of metal atoms or ions within the cluster. After reacting a preformed metal cluster with the multidentate organic ligands described herein to form a metal-organic framework material, the ligands previously stabilizing the preformed metal cluster may become incorporated as residual ligands within at least a portion of the plurality of internal pores defined in the metal-organic framework material. Ligands added exogenously during the synthesis of a metal-organic framework material may similarly become incorporated as residual ligands as well. As described in further detail hereinbelow, at least a portion of the residual ligands may be removed from the internal pores of a metal-organic framework material following its synthesis. Removal of the residual ligands may be desirable to increase the available pore space for filling with another molecule, such as for promoting a catalytic reaction or for facilitating gas storage, for example. Advantageously, minimal reorganization of the network structure may take place upon removal of the residual ligands from the internal pores. As such, the metal-organic framework materials of the present disclosure may either comprise one or more residual ligands in the plurality of internal pores or be substantially free of residual ligands.

One example of a suitable metal cluster that may be used to promote formation of a metal-organic framework material with the multidentate organic ligands described herein is a zinc cluster described by the formula $Zn_4O(2,2\text{-dimethylbutanoic acid})_6$ ($Zn_4O(DMBA)_6$), in which DMBA or a salt thereof becomes a residual ligand following formation of a metal-organic framework material. Accordingly, some embodiments of the metal-organic framework materials disclosed herein may further comprise a carboxylic acid, such as 2,2-dimethylbutanoic acid, or a salt thereof incorporated within at least a portion of the plurality of internal pores defined in the metal-organic framework material. Metal clusters comprising other types of carboxylic acids may similarly leave behind the carboxylic acids or the corresponding carboxylate salts as residual ligands in the internal pores following formation of the metal-organic framework material. Illustrative carboxylic acids that may be used include, for example, acetic acid, benzoic acid, trimethylacetic acid, and the like. Amidate clusters may be used in forming the metal-organic framework materials disclosed herein in some or other embodiments.

Accordingly, still more specific metal-organic framework materials of the present disclosure may comprise a plurality of divalent metal centers, and an N,N'-di(1H-pyrazol-4-yl)ethane-1,2-diimine multidentate organic ligand coordinated to the plurality of metal centers via at least one binding site to define an at least partially crystalline network structure having a plurality of internal pores. In yet still more specific examples, such metal-organic framework materials may comprise a plurality of zinc centers, and an N,N'-di(1H-pyrazol-4-yl)ethane-1,2-diimine multidentate organic ligand coordinated to the plurality of zinc centers via at least one binding site to define an at least partially crystalline network structure having a plurality of internal pores. In some embodiments, the metal-organic framework materials may further comprise a residual ligand incorporated within at least a portion of the plurality of internal pores in the network structure, with 2,2-dimethylbutanoic acid, a salt thereof, or another carboxylic acid/carboxylate salt being representative examples of such residual ligands. In some or other more specific embodiments, the metal-organic framework materials of the present disclosure comprising a plurality of zinc centers may further comprise a plurality of nickel centers also coordinated to the N,N'-di(1H-pyrazol-4-yl)ethane-1,2-diimine ligand via at least one binding site.

In some embodiments, impurities may remain in the metal-organic framework material following its synthesis. For example, in some cases, a portion of the metal salt used for promoting formation of the metal-organic framework material may remain as an unreacted starting material. This may be the case with zinc oxide or zinc carbonate in some cases. Such impurities may be removed by re-subjecting the metal-organic framework material to synthesis conditions for producing the framework structure.

In some or other more particular embodiments, metal-organic framework materials of the present disclosure may comprise a plurality of metal centers, and a multidentate organic ligand coordinated to the plurality of metal centers via at least one binding site to define an at least partially crystalline network structure having a plurality of internal pores. The multidentate organic ligand comprises a first binding site and a second binding site each comprising a pyrazole or a salicylate that are bridged together with a third binding site comprising a diimine moiety. The diimine moiety may be substituted or unsubstituted and comprise a reaction product of a vicinal diketone, a vicinal ketoaldehyde, or glyoxal. A divalent metal may comprise the plurality of metal centers in particular embodiments.

In still other more particular embodiments, metal-organic framework materials of the present disclosure may comprise a plurality of divalent metal centers and a 5,5'-(((1E,2E)-ethane-1,2-diylidene)bis(azaneylylidene))bis(2-hydroxybenzoic acid) multidentate organic ligand coordinated to the plurality of divalent metal centers via at least one binding site to define an at least partially crystalline network structure having a plurality of internal pores. The divalent metal centers may comprise zinc in particular embodiments, although other divalent metals may also suitably be present.

The metal-organic framework materials formed according to the disclosure herein may be characterized in terms of their internal porosity, particularly metal-organic framework materials formed from N,N'-di(1H-pyrazol-4-yl)ethane-1,2-diimine as a multidentate organic ligand. The metal-organic framework materials of the present disclosure may include micropores, mesopores, macropores and any combination thereof. Micropores are defined herein as having a pore size of about 2 nm or below, and mesopores are defined herein as having a pore size from about 2 nm to about 50 nm. Determination of microporosity and/or mesoporosity may be determined by analysis of the nitrogen adsorption isotherms at 77 K, as will be understood by one having ordinary skill in the art. Internal pore volumes and other morphological features of the metal-organic framework materials may similarly be determined from the nitrogen adsorption isotherms, as also will be understood by one having ordinary skill in the art. Surface areas up to about 2000 $m^2/g$, including up to 1300 $m^2/g$ for example, may be obtained according to the disclosure herein with N,N'-di(1H-pyrazol-4-yl)ethane-1,2-diimine as the multidentate organic ligand, with the activation conditions determining the surface area obtained. Pore volumes may range from about 0.09 mL/g to about 0.9 mL/g. Higher surface areas, including up to about 4000 $m^2/g$, and higher pore volumes may be realized with other multidentate organic ligands disclosed herein.

Metal-organic framework materials formed from N,N'-di(1H-pyrazol-4-yl)ethane-1,2-diimine may also be characterized in terms of their X-ray powder diffraction patterns. Since the metal-organic framework materials disclosed herein are somewhat flexible, the X-ray powder diffraction patterns may shift slightly depending on the extent of hydration and the presence of residual ligands. X-ray powder diffraction patterns for several of the metal-organic framework materials disclosed herein are provided in the examples below.

Methods are also described herein for synthesizing the metal-organic framework materials of the present disclosure. Some syntheses may be advantageously conducted with a preformed metal cluster as a metal source, as discussed above, but other metal sources, including some simple metal salts may also be used suitably as well. Optionally, an acid may be combined with the metal source when forming the metal-organic framework material, particularly when using a metal source that is not a preformed metal cluster. Advantageously, the metal source may be selected such that metal-organic framework materials having related, but slightly different network structures, are obtained. As such, selection of the metal source used for synthesizing the metal-organic framework materials disclosed herein may allow tailoring of the network structure to be realized for compatibility with particular applications.

Accordingly, certain methods of the present disclosure may comprise: combining a metal source with a multidentate organic ligand comprising a first binding site and a second binding site that are bridged together with a third binding site that comprises a diimine moiety, particularly a diimine moiety that is a reaction product of glyoxal, and reacting the metal source with the multidentate organic ligand to form a metal-organic framework material having an at least partially crystalline network structure with a plurality of internal pores defined therein and comprising a plurality of metal centers coordinated to at least one of the first binding site, the second binding site, or the third binding site. In more specific embodiments, the metal source may be a preformed metal cluster, such as a preformed metal cluster comprising zinc, and more particularly $Zn_4O(2,2\text{-dimethylbutanoate})_6$ or a similar metal carboxylate cluster.

Any of the multidentate organic ligands specified by Formulas 1-6 above may be utilized to synthesize metal-organic framework materials by the methods disclosed herein.

As referenced above, the metal-organic framework materials disclosed herein may comprise a residual ligand incorporated in the internal pores, wherein the residual ligand may originate from a metal cluster used in forming the metal-organic framework materials. Alternately, the residual ligand may arise from use of the ligand in the synthesis as a mineralization aid, where the residual ligand is added to the synthesis in free form with the metal source. 2,2-Dimethylbutanoic acid, other carboxylic acids, or a salt thereof are representative examples of a residual ligands that may remain within at least a portion of the internal pores of the metal-organic framework materials formed according to the disclosure herein. Certain methods of the present disclosure may remove at least a portion of the residual ligands, particularly 2,2-dimethylbutanoic acid, a salt thereof, or other carboxylic acid ligands, from the internal pores. In particular, methods of the present disclosure may comprise thermally or chemically removing the 2,2-dimethylbutanoic acid or other carboxylic acid, or a salt thereof from the plurality of internal pores.

Zinc oxide or other metal salt starting materials, including alternative metal oxides or basic zinc carbonate, may remain as residual impurities in the metal-organic framework materials in certain instances. Removal of zinc oxide or other metal salt or metal oxide starting materials may take place by re-reacting the metal-organic framework material with additional multidentate organic ligand under the conditions originally employed to form the metal-organic framework material. Other methods for metal salt removal may also be suitable for use in the disclosure herein.

In some embodiments, residual ligands, such as 2,2-dimethylbutanoic acid or a salt thereof, may be thermally removed from the plurality of internal pores. Sufficiently elevated temperatures may either volatilize the residual ligands above their boiling point or promote thermal decomposition in some cases. In illustrative embodiments, thermal removal of the residual ligands may take place at a temperature of at least about 250° C., or at least about 300° C., or at least about 350° C., or at least about 400° C. Selection of a suitable temperature for thermal removal of residual ligands may be dictated by the boiling point of the residual ligands, their thermal stability, and/or the thermal stability of the metal-organic framework material itself.

In some embodiments, the residual ligands may be removed chemically. Chemical removal of the residual ligands may comprise contacting a metal-organic framework material containing one or more residual ligands with a chemical compound or solution that either reacts with the residual ligands or promotes their physical displacement from the plurality of internal pores. In more specific embodiments, an aqueous salt solution, such as an aqueous ammonium chloride solution, may be used to promote chemical removal of certain residual ligands, such as 2,2-dimethylbutanoic acid, other carboxylic acids, or a salt thereof. Without being bound by any theory or mechanism, it is believed that aqueous salt solutions may promote chemical removal of the residual ligands through simple ion exchange or protonation of the residual ligands. The modest acidity of ammonium chloride may aid in promoting the latter mechanism.

In more specific embodiments, methods for synthesizing metal-organic framework materials according to the disclosure herein may comprise: combining a metal source with a multidentate organic ligand comprising N,N'-di(1H-pyrazol-4-yl)ethane-1,2-diimine, and reacting the metal source with the multidentate organic ligand to form a metal-organic framework material having an at least partially crystalline network structure with a plurality of internal pores defined therein and comprising a plurality of metal centers coordinated to the multidentate organic ligand at one or more binding sites. The metal source may comprise a divalent metal in particular embodiments. In more specific embodiments, the metal source may be a preformed metal cluster, such as a preformed metal cluster comprising zinc, and more particularly $Zn_4O(2,2\text{-dimethylbutanoate})_6$ or other zinc carboxylate clusters.

Other suitable zinc sources for forming metal-organic framework materials when using N,N'-di(1H-pyrazol-4-yl) ethane-1,2-diimine as a multidentate organic ligand include, for example, zinc oxide, basic zinc carbonate, and zinc acetate. Both of these metal sources may promote formation of a metal-organic framework material having a network structure related to that formed in the presence of $Zn_4O(2,2\text{-dimethylbutanoic acid})_6$. Optionally, a free carboxylic acid, such as 2,2-dimethylbutanoic acid or other carboxylic acid, may be combined with the foregoing zinc sources for formation of the metal-organic framework materials.

In other more specific embodiments, methods for synthesizing metal-organic framework materials according to the disclosure herein may comprise: combining a metal source with a multidentate organic ligand comprising 5,5'-(((1E,2E)-ethane-1,2-diylidene)bis(azaneylylidene))bis(2-hydroxybenzoic acid), and reacting the metal source with the multidentate organic ligand to form a metal-organic framework material having an at least partially crystalline network structure with a plurality of internal pores defined therein and comprising a plurality of metal centers coordinated to the multidentate organic ligand at one or more binding sites. The metal source may comprise a divalent metal in particular embodiments. In more specific embodiments, the metal source may be a preformed metal cluster, such as a preformed metal cluster comprising zinc, and more particularly $Zn_4O(2,2\text{-dimethylbutanoate})_6$ or other zinc carboxylate cluster.

Other suitable zinc sources for forming metal-organic framework materials when using 5,5'-(((1E,2E)-ethane-1,2-diylidene)bis(azaneylylidene))bis(2-hydroxybenzoic acid) as a multidentate organic ligand include, for example, zinc oxide, basic zinc carbonate, and zinc acetate. Both of these metal sources may promote formation of a metal-organic framework material having a network structure related to that formed in the presence of $Zn_4O(2,2\text{-dimethylbutanoic acid})_6$. Optionally, a free carboxylic acid, such as 2,2-dimethylbutanoic acid or other carboxylic acid, may be combined with the foregoing zinc sources for formation of the metal-organic framework materials.

Some or other methods of the present disclosure may comprise exchanging at least a portion of a first metal comprising the plurality of metal centers for a second metal. For example, at least a portion of zinc atoms comprising the metal centers may be exchanged for nickel atoms, according to various embodiments of the present disclosure. Metal exchange may be affected by contacting the metal-organic framework materials with a salt solution, for example.

Still other methods of the present disclosure may comprise introducing an additional metal into the metal-organic framework material without substantially promoting exchange of an existing metal in the metal-organic framework material. Incorporating additional metal in this manner may take place within the pores of the metal-organic framework material or at one or more of the binding sites.

Certain metal-organic framework materials of the present disclosure may have catalytic properties, either by themselves or after activation in the presence of a suitable activator. One particular example of a catalytic metal-organic framework material may comprise a reaction product of N,N'-di(1H-pyrazol-4-yl)ethane-1,2-diimine and a preformed zinc cluster, particularly $Zn_4O(2,2\text{-dimethylbutanoic acid})_6$ or other zinc carboxylate cluster, basic carbonate, or zinc oxide, in which at least a portion of the metal centers have zinc exchanged for a catalytically active metal such as nickel.

As such, catalyst systems of the present disclosure may comprise a catalyst precursor comprising such metal-organic framework materials and a suitable activator, particularly an alumoxane activator such as methylalumoxane (MAO). Other suitable activators for the metal-organic framework materials disclosed herein may include compounds containing a non-coordinating anion, especially borane and borate compounds. Particularly useful borane and borate compounds containing a non-coordinating anion or similar entity include, for example, $B(C_6F_5)_3$, $[PhNMe_2H]^+[B(C_6F_5)_4]^-$, $[Ph_3C]^+[B(C_6F_5)_4]^-$, and $[PhNMe_2H]^+[B(C_{10}F_7)_4]^-$.

A non-coordinating anion (NCA) is defined to mean an anion either that does not coordinate to a metal center or that does coordinate to a metal center, but only weakly. The term NCA is defined to include multicomponent NCA-containing activators, such as N,N-dimethylanilinium tetrakis(pentafluorophenyl)borate and N,N-dimethylanilinium tetrakis (heptafluoronaphthyl)borate, that contain an acidic cationic group and the non-coordinating anion. The term NCA is also defined to include neutral Lewis acids, such as tris(pentafluorophenyl)boron, that can react with a catalyst precursor to form an activated species by abstraction of an anionic group. Typically, NCAs coordinate weakly enough that a neutral Lewis base, such as an olefin, can displace it from the metal center. The term non-coordinating anion includes neutral activators, ionic activators, and Lewis acid activators.

Accordingly, the present disclosure also provides catalytic methods, particularly catalytic methods for promoting olefin oligomerization and/or isomerization. Such methods may comprise: providing a catalyst precursor comprising a reaction product of N,N'-di(1H-pyrazol-4-yl)ethane-1,2-diimine and a preformed zinc cluster or zinc oxide, in which the reaction product is a metal-organic framework material having an at least partially crystalline network structure with a plurality of internal pores defined therein and comprising a plurality of metal centers comprising zinc coordinated to at least one binding site in the N,N'-di(1H-pyrazol-4-yl) ethane-1,2-diimine; exposing the catalyst precursor to an activator to form an activated catalyst; contacting the activated catalyst with an olefin; and oligomerizing the olefin in the presence of the activated catalyst. At least a portion of the metal centers may have zinc exchanged for another catalytically active metal, such as Ni(II), according to more specific embodiments of the present disclosure.

In some or other embodiments, catalytic methods of the present disclosure may comprise: providing a catalyst system comprising an activator and a reaction product of N,N'-di(1H-pyrazol-4-yl)ethane-1,2-diimine and a preformed zinc cluster, basic zinc carbonate, or zinc oxide, in which the reaction product is a metal-organic framework material having an at least partially crystalline network structure with a plurality of internal pores defined therein and comprising a plurality of metal centers comprising zinc and nickel coordinated to at least one binding site in the N,N'-di(1H-pyrazol-4-yl)ethane-1,2-diimine; contacting the catalyst system with an olefin; and oligomerizing the olefin in the presence of the catalyst system. In further embodiments, the such catalytic methods may further comprise contacting a metal-organic framework material formed from N,N'-di(1H-pyrazol-4-yl)ethane-1,2-diimine and preformed zinc cluster, basic zinc carbonate, or zinc oxide with a Ni(II) source, and exchanging zinc atoms associated with the metal centers for Ni(II). A small extent of olefin isomerization may also occur under the reaction conditions.

Olefins that may suitably undergo oligomerization according to the disclosure herein include, for example, any $C_3$-$C_{40}$ alkene, which may be straight chain or branched, cyclic or acyclic, and terminal or non-terminal, optionally containing heteroatom substitution. In more specific embodiments, the olefin may comprise a $C_3$-$C_{12}$ alkene such, for example, ethene, propene, 1-butene, 2-butene, 1-pentene, cyclopentene, 1-hexene, cyclohexene, 1-octene, 1-decene, 1-dodecene, or any combination thereof. The olefin contacted with the catalyst systems of the present disclosure may comprise any single alkene or any mixture of one or more of the foregoing alkenes.

In certain embodiments, olefin oligomerization may take place at a temperature ranging between about 20° C. and about 300° C., or between about 20° C. and about 100° C. In more particular embodiments, oligomerization may take place at a temperature ranging between about 20° C. and about 60° C., or between about 20° C. and about 50° C., or between about 20° C. and about 40° C., or between about 20° C. and about 30° C. In still more specific embodiments, oligomerization may take place at about room temperature or between room temperature and about 40° C.

In certain embodiments, olefin oligomerization may take place at atmospheric pressure. Oligomerization reaction conditions that are above atmospheric pressure are also possible in alternative embodiments of the present disclosure. For example, in some embodiments of the present disclosure, the pressure may be up to about 1400 psi or up to about 1000 psi.

In certain embodiments, olefin oligomerization may take place under an inert atmosphere. Suitable inert atmospheres may include, for example, helium, argon, neon, or nitrogen, for example. In some or other embodiments, olefin oligomerization may take place with substantial exclusion of water.

In certain embodiments, olefin oligomerization may take place over a period of time ranging between about 5 minutes and about 24 hours. In more specific embodiments, olefin oligomerization may take place over a period of time ranging between about 20 minutes and about 6 hours, or between about 30 minutes and about 4 hours, or between about 30 minutes and about 2 hours, or between about 10 minutes and about 90 minutes, or between about 10 minutes and about 30 minutes, or between about 20 minutes and about 90 minutes, or between about 20 minutes and about 60 minutes.

In certain embodiments, the metal-organic framework material may be present in an amount ranging between about 0.1% to about 50% by weight of olefin. In more specific embodiments, the metal-organic framework material may be present in an amount ranging between about 0.05% to about 15% by weight of the olefin, or about 0.5% to about 25% by weight, or about 1% to about 15% by weight, or between about 2% to about 12% by weight.

Embodiments disclosed herein include:

A. Metal-organic framework materials having a diimine scaffold. The metal-organic framework materials comprise: a plurality of metal centers; and a multidentate organic ligand coordinated to the plurality of metal centers via at least one binding site to define an at least partially crystalline network structure having a plurality of internal pores; wherein the multidentate organic ligand comprises a first binding site and a second binding site that are bridged together with a third binding site, the third binding site comprising a diimine moiety that is a reaction product of glyoxal.

B1. Metal-organic framework materials having a diimine scaffold with orthogonal pyrazole or salicylate ligands. The metal-organic framework materials comprise: a plurality of metal centers; and a multidentate organic ligand coordinated to the plurality of metal centers via at least one binding site to define an at least partially crystalline network structure having a plurality of internal pores; wherein the multidentate organic ligand comprises a first binding site and a second binding site each comprising a pyrazole or a salicylate that are bridged together with a third binding site comprising a diimine moiety.

B2. Metal-organic framework materials having a N,N'-di(1H-pyrazol-4-yl)ethane-1,2-diimine scaffold and comprising a divalent metal. The metal-organic framework materials comprise: a plurality of divalent metal centers; and an N,N'-di(1H-pyrazol-4-yl)ethane-1,2-diimine multidentate organic ligand coordinated to the plurality of divalent metal centers via at least one binding site to define an at least partially crystalline network structure having a plurality of internal pores.

B3. Metal-organic framework materials having a 5,5'-(((1E,2E)-ethane-1,2-diylidene)bis(azaneylylidene))bis(2-hydroxybenzoic acid) scaffold and comprising a divalent metal. The metal-organic framework materials comprise: a plurality of divalent metal centers; and a 5,5'-(((1E,2E)-ethane-1,2-diylidene)bis(azaneylylidene))bis(2-hydroxybenzoic acid) multidentate organic ligand coordinated to the plurality of divalent metal centers via at least one binding site to define an at least partially crystalline network structure having a plurality of internal pores.

C. Methods for making a metal-organic framework material having a diimine scaffold. The methods comprise: combining a metal source with a multidentate organic ligand comprising a first binding site and a second binding site that are bridged together with a third binding site, the third binding site comprising a diimine moiety that is a reaction product of glyoxal; and reacting the metal source with the multidentate organic ligand to form a metal-organic framework material having an at least partially crystalline network structure with a plurality of internal pores defined therein and comprising a plurality of metal centers coordinated to at least one of the first binding site, the second binding site, or the third binding site.

D1. Methods for making a metal-organic framework material having a N,N'-di(1H-pyrazol-4-yl)ethane-1,2-diimine multidentate organic ligand. The methods comprise: combining a metal source with a multidentate organic ligand comprising N,N'-di(1H-pyrazol-4-yl)ethane-1,2-diimine; and reacting the metal source with the multidentate organic ligand to form a metal-organic framework material having an at least partially crystalline network structure with a plurality of internal pores defined therein and comprising a plurality of metal centers coordinated to the multidentate organic ligand at one or more binding sites.

D2. Methods for making a metal-organic framework material having a 5,5'-(((1E,2E)-ethane-1,2-diylidene)bis(azaneylylidene))bis(2-hydroxybenzoic acid) multidentate organic ligand. The methods comprise: combining a metal source with a multidentate organic ligand comprising 5,5'-(((1E,2E)-ethane-1,2-diylidene)bis(azaneylylidene))bis(2-hydroxybenzoic acid); and reacting the metal source with the multidentate organic ligand to form a metal-organic framework material having an at least partially crystalline network structure with a plurality of internal pores defined therein and comprising a plurality of metal centers coordinated to the multidentate organic ligand at one or more binding sites.

E. Catalytic methods utilizing a metal-organic framework material having a diimine scaffold. The methods comprise: providing a catalyst precursor comprising a reaction product of N,N'-di(1H-pyrazol-4-yl)ethane-1,2-diimine and a preformed zinc cluster, ZnO, or basic zinc carbonate, the reaction product being a metal-organic framework material having an at least partially crystalline network structure with a plurality of internal pores defined therein and comprising a plurality of metal centers comprising zinc coordinated to at least one binding site in the N,N'-di(1H-pyrazol-4-yl)ethane-1,2-diimine; exposing the catalyst precursor to an activator to form an activated catalyst; contacting the activated catalyst with an olefin; and oligomerizing the olefin while the olefin contacts the activated catalyst.

Embodiments A-E may have one or more of the following additional elements in any combination:

Element 1: wherein at least one of the first binding site and the second binding site comprises a pyrazole.

Element 1A: wherein the first binding site and the second binding site are each independently a pyrazole.

Element 2: wherein the first binding site and the second binding site are each an unsubstituted pyrazole.

Element 3: wherein the multidentate organic ligand is N,N'-di(1H-pyrazol-4-yl)ethane-1,2-diimine.

Element 4: wherein at least a portion of the plurality of metal centers comprise a divalent metal.

Element 5: wherein the metal-organic framework material further comprises: a residual ligand or a metal salt incorporated within at least a portion of the plurality of internal pores.

Element 6: wherein the first binding site and the second binding site are each a salicylate or a 3,5-benzenedicarboxylate.

Element 6A: wherein the diimine moiety comprises a reaction product of a vicinal diketone, a vicinal ketoaldehyde, or glyoxal.

Element 6B: wherein the divalent metal centers comprise zinc.

Element 7: wherein the metal-organic framework material further comprises: a carboxylic acid or a salt thereof incorporated within at least a portion of the plurality of internal pores.

Element 8: wherein the metal-organic framework material further comprises: a plurality of nickel centers coordinated to the N,N'-di(1H-pyrazol-4-yl)ethane-1,2-diimine multidentate organic ligand via at least one binding site.

Element 9: wherein the metal-organic framework material further comprises: a ZnO impurity.

Element 10: wherein the metal source is a preformed metal cluster.

Element 11: wherein the preformed metal cluster comprises zinc.

Element 12: wherein the preformed metal cluster comprises $Zn_4O(2,2\text{-dimethylbutanoate})_6$.

Element 13: wherein at least a portion of the plurality of internal pores contain a residual ligand or a metal salt.

Element 14: wherein the method further comprises: thermally or chemically removing the residual ligand or the metal salt from the plurality of internal pores.

Element 15: wherein the method further comprises: exchanging at least a portion of a first metal comprising the plurality of metal centers for a second metal.

Element 16: wherein the metal source comprises zinc oxide, zinc acetate or basic zinc carbonate.

Element 16A: wherein the metal source comprises a metal selected from the group consisting of magnesium, manganese, chromium, iron, copper, cobalt, nickel, and any combination thereof.

Element 17: wherein the first metal is zinc and the second metal is nickel.

Element 18: wherein at least a portion of the metal centers have zinc exchanged for a catalytically active metal.

Element 19: wherein the catalytically active metal comprises Ni(II).

Element 20: wherein the activator comprises an alumoxane.

Element 21: wherein an acid is combined with the metal source when forming the metal-organic framework material.

Element 22: wherein the metal source comprises zinc oxide and an acid is combined with the metal source when forming the metal-organic framework material.

By way of non-limiting example, exemplary combinations applicable to A include 1 or 1A and 4; 2 and 4; 3 and 4; 1 or 1A and 5; 2 and 5; 3 and 5; 4 and 6; 5 and 6; 1 or 1A and 8; 2 and 8; and 3 and 8. Exemplary combinations applicable to B1 include 4 and 5; 4 and 6A or 6B; 5 and 6A or 6B; and 6A and 6B. Exemplary combinations applicable to B2 and B3 include 7 and 8; 8 and 9; 6A or 6B and 7; 6A or 6B and 8; 6A or 6B and 9; and 6A and 6B. Exemplary combinations applicable to C include 1 or 1A and 4; 2 and 4; 3 and 4; 1 or 1A and 5; 2 and 5; 3 and 5; 4 and 6; 5 and 6; 10 and 11; 10 and 12; 1 or 1A and 13; 2 and 13; 3 and 13; 4 and 13; 6 and 13; 10 and 13; 12 and 13; 13 and 14; 1 or 1A, 13 and 14; 2, 13 and 14; 4, 13 and 14; 6, 13 and 14; 10, 13 and 14; 12, 13 and 14; 1 or 1A and 21 or 22; 2 and 21 or 22; 3 and 21 or 22; 4 and 21 or 22; 5 and 21 or 22; 6 and 21 or 22; 7 and 21 or 22; 8 and 21 or 22; 9 and 21 or 22; 13 and 21 or 22; 14 and 21 or 22; 15 and 21 or 22; 16 or 16A and 21 or 22; 17 and 21 or 22; 18 and 21 or 22; 19 and 21 or 22; and 20 and 21 or 22. Exemplary combinations applicable to D1 and D2 include 10 and 11; 10 and 12; 10 and 13; 10, 12 and 13; 13 and 14; 13 and 15; 15 and 17; 13 and 21 or 22; 14 and 21 or 22; 15 and 21 or 22; 16 or 16A and 21 or 22; 17 and 21 or 22; 18 and 21 or 22; 19 and 21 or 22; and 20 and 21 or 22. Exemplary combinations applicable to E include 18 and 19; 18 and 20; and 18-20.

To facilitate a better understanding of the embodiments described herein, the following examples of various representative embodiments are given. In no way should the following examples be read to limit, or to define, the scope of the present disclosure.

EXAMPLES

X-ray powder diffraction patterns in the examples below were obtained using Cu K-α radiation. Reported peak positions below are provided as a range of values, which is characteristic of the flexibility of network structure of the metal-organic framework materials. Minor peaks having a relative intensity below 6% are not reported in the tables below.

BET surface areas in the examples below were determined from $N_2$ adsorption isotherms obtained at 77 K. $N_2$ adsorption isotherms were measured using a Tristar II analyzer (Micromeritics) at 77 K. Before measurement, the samples were degassed at 150° C. to a constant pressure of $10^{-5}$ torr for 4 hours. The surface area was then measured by the amount of $N_2$ adsorbed onto the surface of the sample. Regression analysis was subsequently applied to the data, resulting in an isotherm. The isotherms were further analyzed to calculate the micropore volume and other quantities.

Example 1: Synthesis of N,N'-di(1H-pyrazol-4-yl)ethane-1,2-diimine

A solution of 4-aminopyrazole was prepared by dissolving 6.505 g 4-aminopyrazole in 650 mL absolute ethanol. To the 4-aminopyrazole solution was then added 5.678 g glyoxal, and the combined reaction mixture was heated at reflux for 16 hours. Purple solids formed over the course of the reaction and were collected by filtration. The solids were washed with 150 mL absolute ethanol and then dried at 90° C. The reaction yielded 6.025 g of product (82% yield). Structure confirmation was provided by $^1$H NMR (FIG. 1). $^1$H NMR (DMSO-d$_6$): 13.05 (2H, broad singlet, NH), 8.44 (2H, singlet, pyrazole H), and 7.87/8.10 (4H, overlapping broad singlets, pyrazole H and imine CH).

Example 2A: Metal-Organic Framework Synthesis Using $Zn_4O(DMBA)_6$

Figure 2:
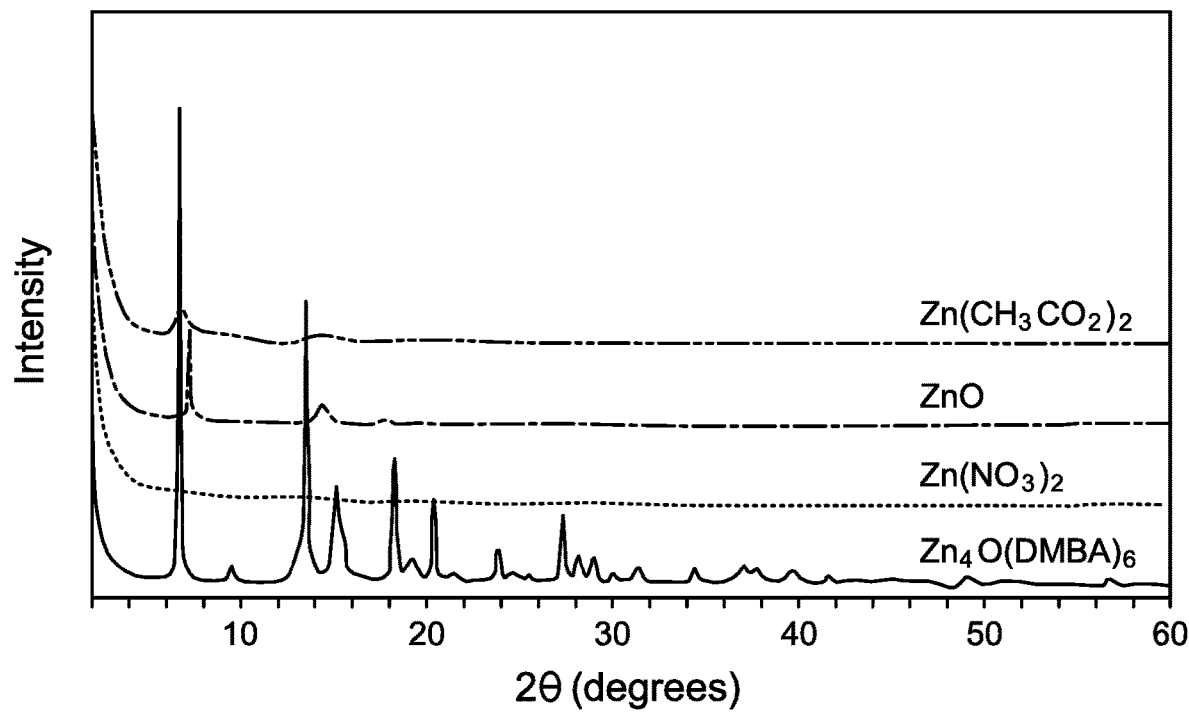
FIG. 2 shows comparative X-ray powder diffraction patterns for the products obtained in Examples 2A-2D.

The ligand of Example 1 (400 mg) was combined with 40 mL N,N-dimethylformamide (DMF), 10 mL water, and 0.5 mL 2 M $HNO_3$ in a 100 mL roundbottom flask. To the flask was added 850 mg $Zn_4O(2,2$-dimethylbutanoate$)_6$ (2,2-dimethylbutanoate=DMBA). Synthesis of $Zn_4O(DMBA)_6$ was accomplished by literature methods described in M. R. Gordon, et al., "Preparation and properties of tetrazinc $\mu_4$-oxohexa-$\mu$-carboxylates (basic zinc carboxylates)," Can. J. Chem., 1983, pp. 1218-1221, 61. A green precipitate rapidly formed when the $Zn_4O(DMBA)_6$ was added. The reaction mixture was stirred at 100° C. for 16 hours, after which the solids were isolated by filtration. The solids were washed with DMF on the filter and then re-suspended in fresh DMF (~40 mL). The suspended solids were then heated at 60° C. for several hours to redissolve residual starting materials. After the further heating period, the remaining solids were collected by filtration, washed with acetone and dried at 90° C. The crystalline product was characterized by X-ray powder diffraction (FIG. 2, discussed further below).

Example 2B: Attempted Metal-Organic Framework Synthesis Using $Zn(NO_3)_2$

Example 2A was repeated except for substituting $Zn(NO_3)_2$ for $Zn_4O(DMBA)_6$. A crystalline product was not obtained in this case, as evidenced by X-ray powder diffraction (FIG. 2, discussed below).

Example 2C: Metal-Organic Framework Synthesis Using ZnO

Example 2C was repeated analogously to Example 2A except for using a slightly different scale, substituting 425 mg ZnO for $Zn_4O(DMBA)_6$, and washing with acetonitrile or methanol. A moderate-crystallinity product was obtained in this case, as evidenced by X-ray powder diffraction (FIG. 2, discussed below). The moderate-crystallinity product appeared to be related to that obtained in Example 2A. Nitric acid or a monocarboxylic acid, such as 2,2-dimethylbutanoic acid, may also be incorporated in the synthesis.

Example 2D-1: Metal-Organic Framework Synthesis Using $Zn(CH_3CO_2)_2$

Example 2A was repeated except for substituting $Zn(CH_3CO_2)_2$ for $Zn_4O(DMBA)_6$. A low-crystallinity product was obtained in this case, as evidenced by X-ray powder diffraction (FIG. 2, discussed below). The low-crystallinity product appeared to be related to that obtained in Example 2A.

Example 2D-2: Metal-Organic Framework Synthesis Using $Zn(CH_3CO_2)_2$ 100 mg of the ligand from example 1 was mixed with 100-120 mg of zinc acetate. 10 mL of a 20 vol % solution of water in N,N-dimethylformamide was added to this mixture along with between 40-120 µL of 2M $HNO_3$. The product proceed in 2D-1 are of higher quality than those in 2D. We notice, however that a mixture of two phases, the phase obtained in 2E and 2F, as well as the phase obtained from example 5.

Example 2E: Metal-Organic Framework Synthesis Using ZnO and a Longer Reaction Time Example 2C was repeated but allowed to stir at temperature for an additional 2 days (72 hours in total). The product was then, like Example 2C, washed with DMF and acetonitrile to obtain the material shown in FIG. 5. ZnO impurities (evident from X-ray powder diffraction) can be removed through acidic washes in DMF/water solution or methanol/water solution ($HNO_3$ or $NH_4Cl$, respectively). Crystallinity was higher with the longer reaction time.

Example 2F: Metal-Organic Framework Synthesis using $Zn_5(OH)_6(CO_3)_2$ (Basic Zinc Carbonate)

The ligand of Example 1 (693 mg) was combined with 80 mL DMF, 20 mL water, and either 0.917 mL 2,2-dimethylbutanoic acid or 0.42 mL acetic acid in a 100 mL roundbottom flask. To the flask was added 402 mg basic zinc carbonate. The reaction mixture was stirred at 100° C. for 16 hours, after which the solids were isolated by filtration. The solids were washed with DMF on the filter and then re-suspended in fresh DMF (~40 mL). The suspended solids were then heated at 60° C. for several hours to redissolve residual starting materials. After the further heating period, the remaining solids were collected by filtration, washed with acetone and dried at 90° C. The crystalline product was characterized by X-ray powder diffraction.

Example 3: Product Characterization

Figure 3:
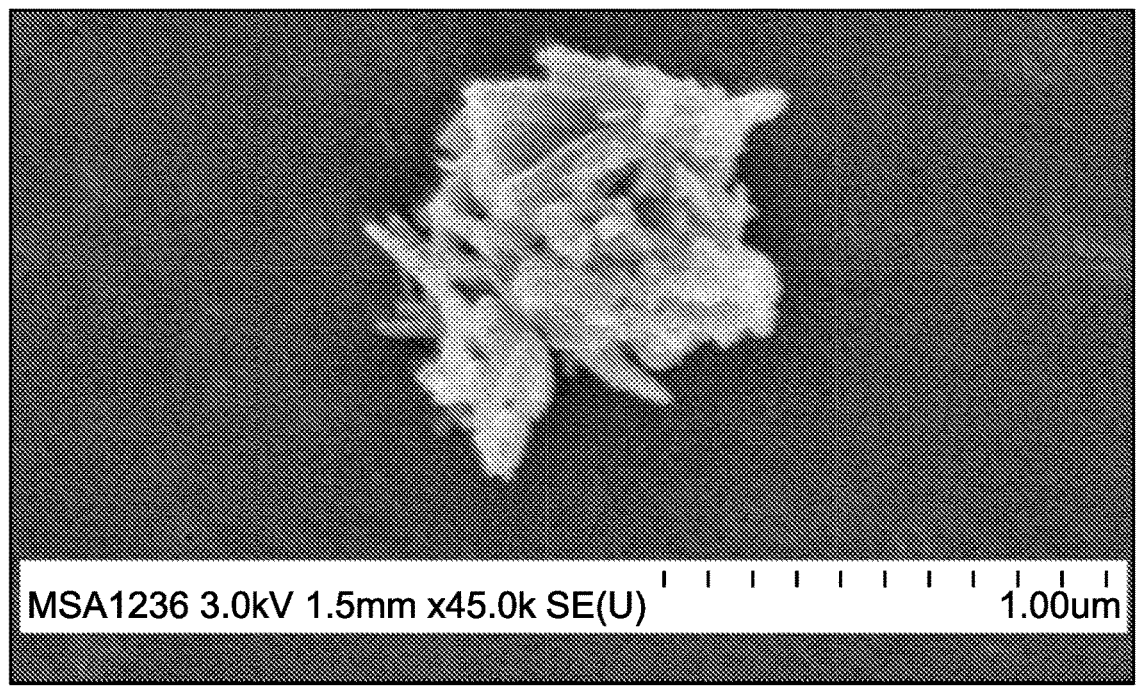
FIG. 3 shows an SEM image of the product of Example 2A.
Figure 2:
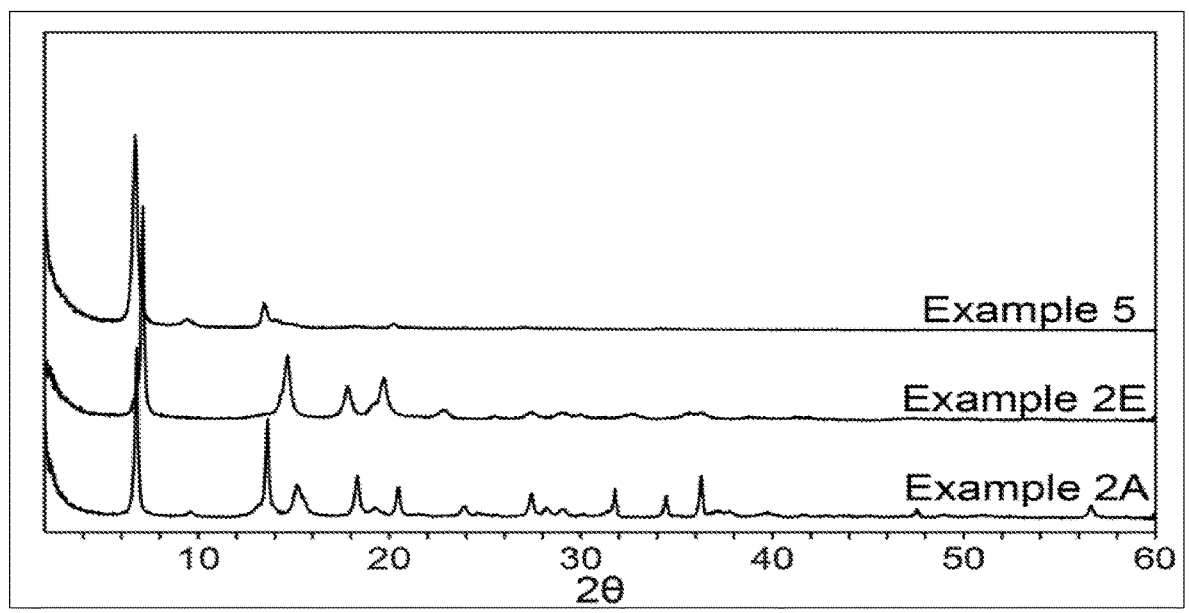

FIG. 2 shows comparative X-ray powder diffraction patterns for the products obtained in Examples 2A-2D. As shown, a highly crystalline product was obtained when using $Zn_4O(DMBA)_6$ as the zinc source in combination with the ligand of Example 1 (Example 2A). Example 2C shows 3 predominant diffraction peaks, but this intensity profile is dependent on degree of drying. The FIG. 2.2 shows comparisons of the X-ray diffraction patterns between Examples 2A, 2E, and 5. The material from Example 2E in this figure is drier than in the original FIG. 2, hence the different intensity profile. FIG. 3 shows an SEM image of the product of Example 2A, which is consistent with the high crystalline morphology indicated by X-ray powder diffraction. Table 1 below summarizes the X-ray powder diffraction patterns and intensities observed for the products of Examples 2A and 2E.

TABLE 1

| Example 2A | | Example 2E | |
|---|---|---|---|
| 2θ (degrees) | Relative Intensity (%) | 2θ (degrees) | Relative Intensity (%) |
| 6.75-6.84 | 100 | 7.1-7.3 | 100 |
| 13.04-13.19 | 5.5-8.5 | 13.0-13.6 | 0-2 |
| 13.57-13.66 | 50.1-55.5 | 14.1-14.8 | 10-30 |
| 15.21-15.26 | 11.3-18.3 | 17.0-18.5 | 5-15 |
| 15.40-15.53 | 6.3-11.9 | 19.0-20.0 | 7-15 |
| 18.28-18.37 | 19.5-24.3 | 21.0-24.0 | 2-7 |
| 20.42-20.50 | 15.2-16.0 | 24.0-26.0 | 0-2 |

Figure 4A:
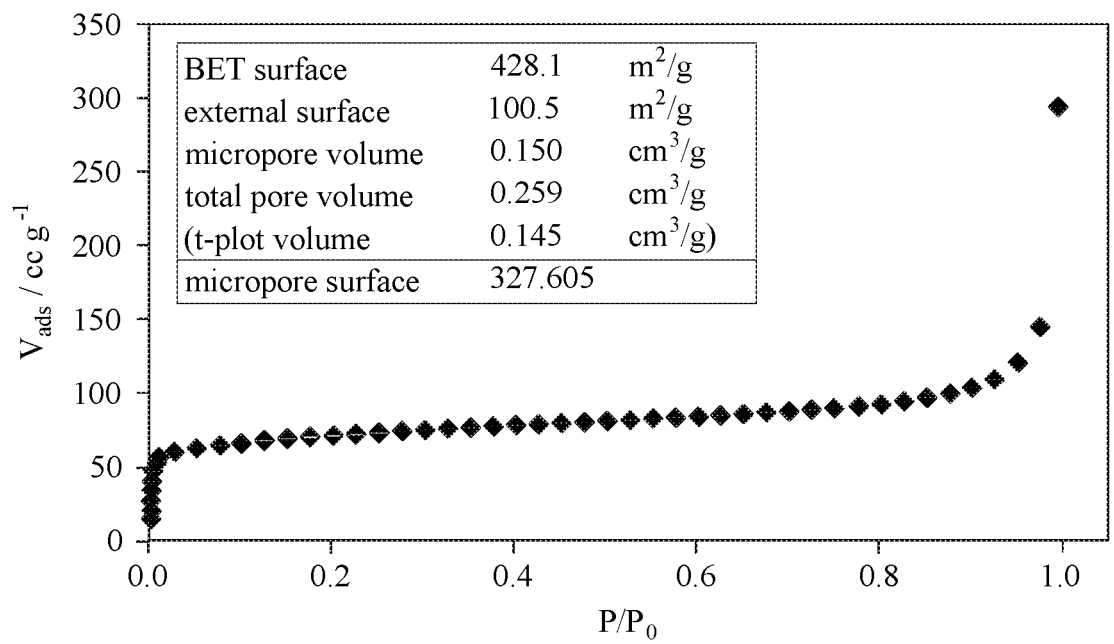
FIGS. 4A and 4B show $N_2$ adsorption isotherms at 77 K for the product of Example 2A after activation at various temperatures.
Figure 4B:
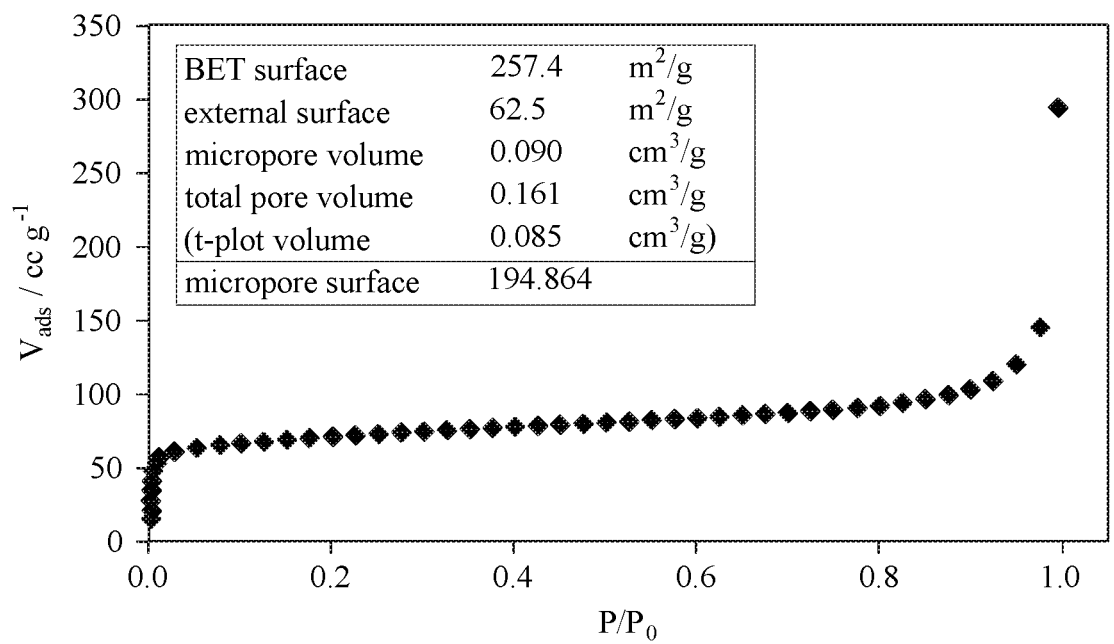

FIGS. 4A and 4B show $N_2$ adsorption isotherms at 77 K for the product of Example 2A after activation at various temperatures. Prior to analysis, the samples were outgassed at 180° C. under a dynamic vacuum of less than $1 \times 10^{-3}$ torr. FIG. 4A shows the $N_2$ adsorption isotherm after product activation at 300° C., and FIG. 4B shows the corresponding $N_2$ adsorption isotherm after product activation at 250° C. Thermal activation was employed to promote activation, possibly by removing 2,2-dimethylbutanoic acid from the interior of the metal-organic framework material. The calculated BET surface area was 428.1 $m^2/g$ for the product activated at 300° C., whereas the BET surface area was only 257.4 $m^2/g$ for the product activated at 250° C. The corresponding total pore volumes were 0.259 $cm^3/g$ and 0.161 $cm^3/g$, respectively. The lower BET surface area and the smaller total pore volume observed at the lower activation temperature is consistent with a decreased degree of 2,2-dimethylbutanoic acid removal.

Referring again to FIG. 2, simple zinc salts led to considerably different products. ZnO and $Zn(CH_3CO_2)_2$ (Examples 2C and 2D) afforded low-crystallinity products that appeared to be a possible structural variant of the product of Example 2A. $Zn(NO_3)_2$ (Example 2B), in contrast, did not form a crystalline product when combined with the ligand of Example 1.

Figure 5:
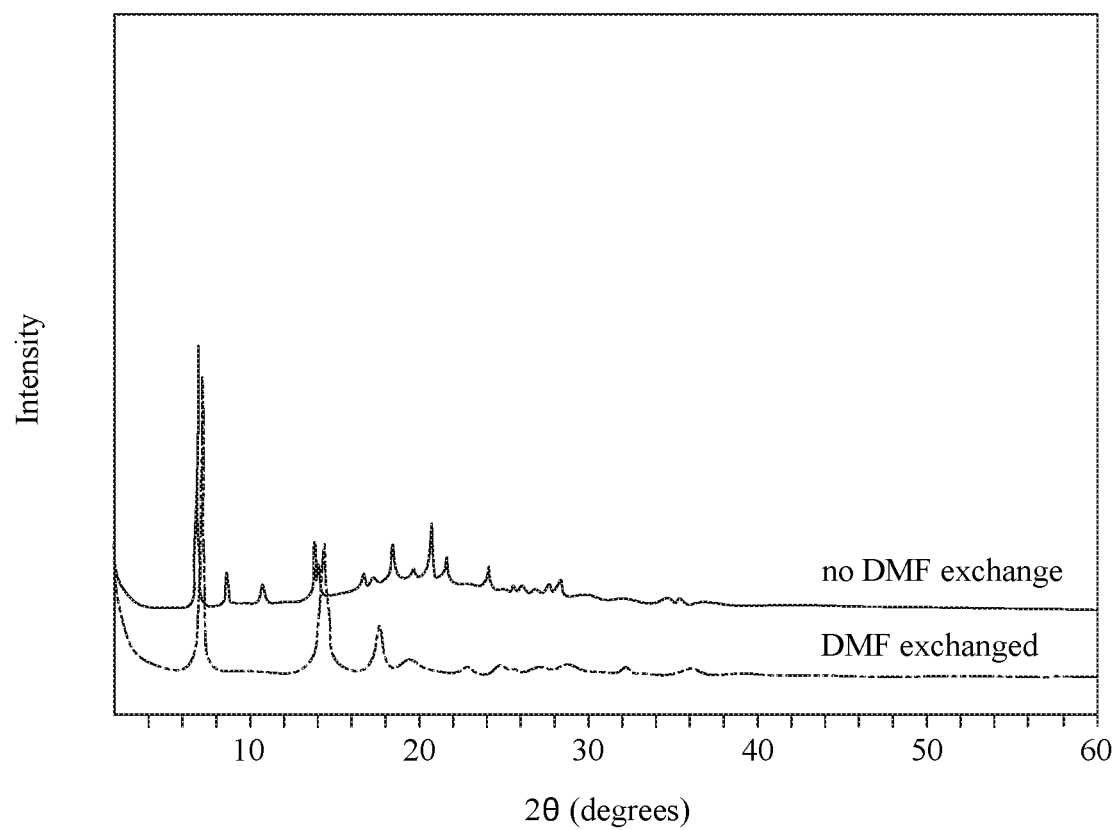
FIG. 5 shows comparative X-ray powder diffraction patterns for the product of Example 2E when saturated with DMF and after exchanging DMF for a low-boiling solvent and further drying.

FIG. 5 shows comparative X-ray powder diffraction patterns for the product of Example 2E when saturated with DMF and after exchanging DMF for a low-boiling solvent and further drying. A three-day reaction time was used to produce the metal-organic framework materials used in this example. Increased crystallinity and a larger pore volume resulted from the longer reaction time. The DMF-exchanged sample (bottom trace) was produced as above, washed with acetonitrile, and dried further. The top trace was produced after re-exposing the dried sample to fresh DMF. The metal-organic framework material expands upon being exposed to fresh DMF, which results in the sharper X-ray powder diffraction peaks. The broad feature centered at a 2θ value of 20° arises from scattering due to the DMF present in the sample.

Figure 6A:
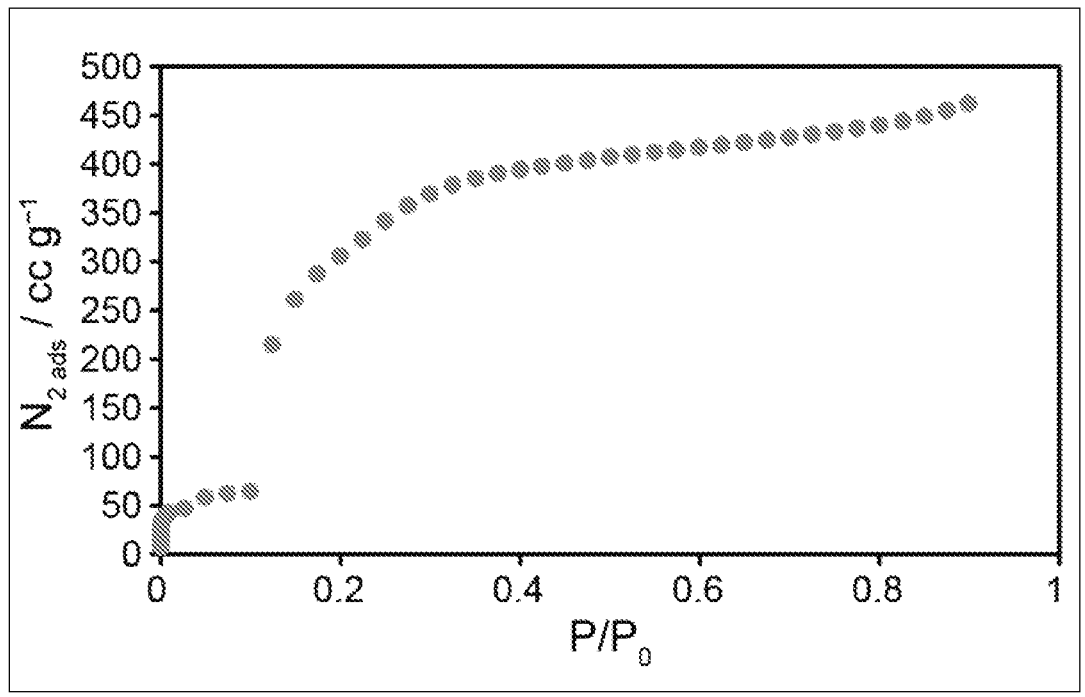
FIGS. 6A-6C show gas adsorption isotherms for the product of Example 2E.
Figure 6B:
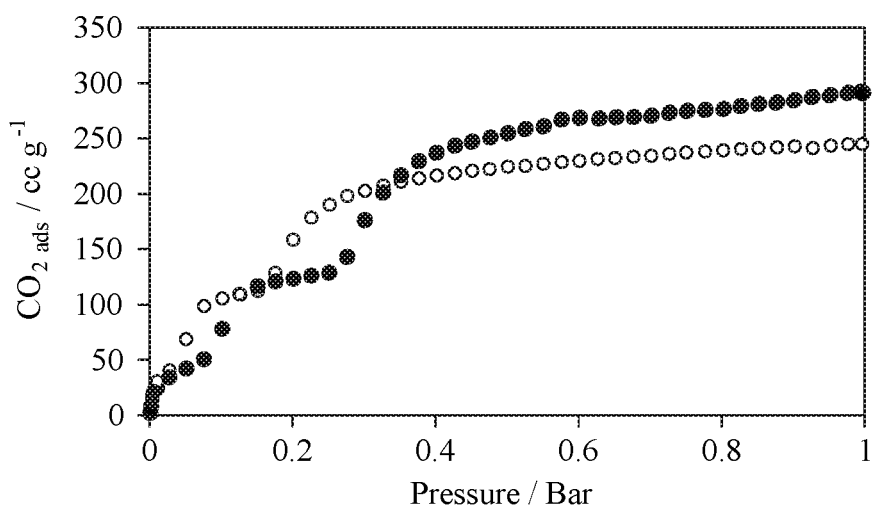
Figure 6C:
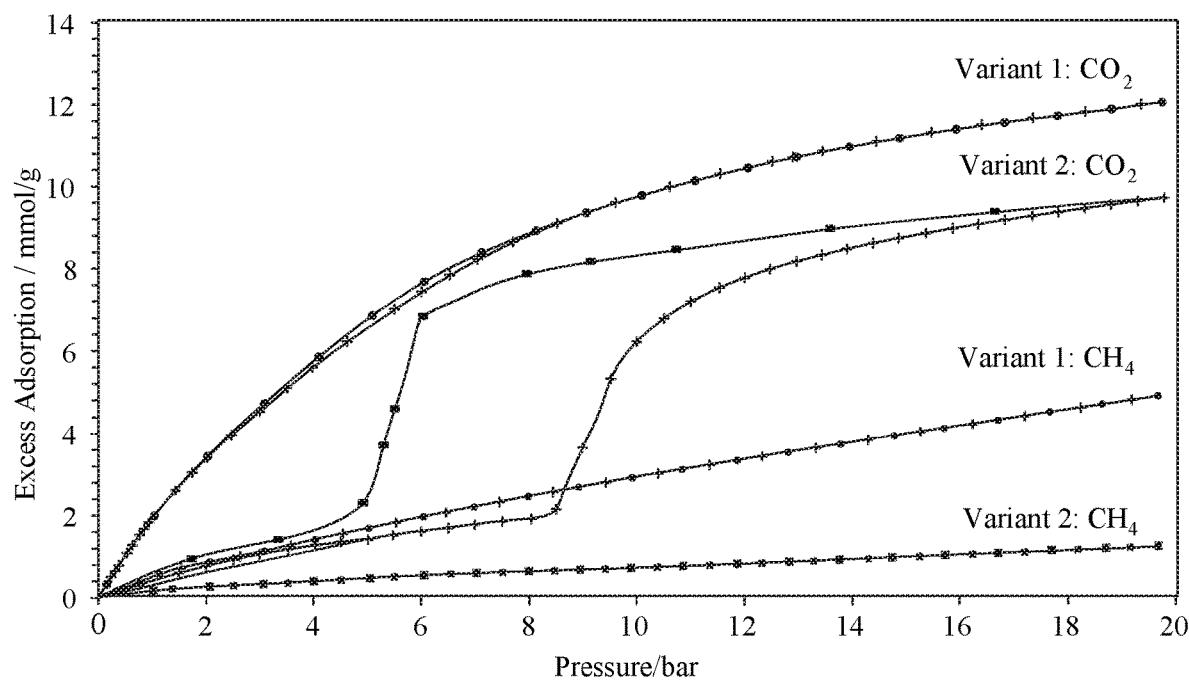

FIGS. 6A-6C show gas adsorption isotherms for the product of Example 2E. FIG. 6A shows the $N_2$ adsorption isotherm at 77 K after product outgassing at 180° C., and FIG. 6B shows the corresponding $CO_2$ adsorption isotherm at 195K for two replicate samples after product outgassing at 180° C. Both isotherms showed multiple steps, particularly between $P/P_o$ ratios of 0.1 to 0.4. This feature is reflective of the flexibility of the metal-organic framework material. Indeed, the crystal structure may change to some degree upon adsorption of various gases. The BET surface area derived from the $N_2$ adsorption isotherm was higher than that of the product of Example 2A, most likely due to the absence of space-filling 2,2-dimethylbutanoic acid molecules in the interior of the metal-organic framework material. FIG. 6C shows $CO_2$ and $CH_4$ adsorption isotherms at 30° C. for the product of Example 2E (2 different batches). As shown, there was batch variability and much lower $CH_4$ adsorption up to instrument pressure limits at 30° C.

Example 4: Zinc Exchange and Product Characterization

The crystalline product of Example 2A (500 mg) was suspended in 50 mL acetonitrile, and 0.85 g $NiCl_2$ was added to the suspension. The reaction mixture was stirred at 50° C. for 16 hours. Thereafter, the solids were isolated by filtration and washed with additional acetonitrile.

Figure 7:
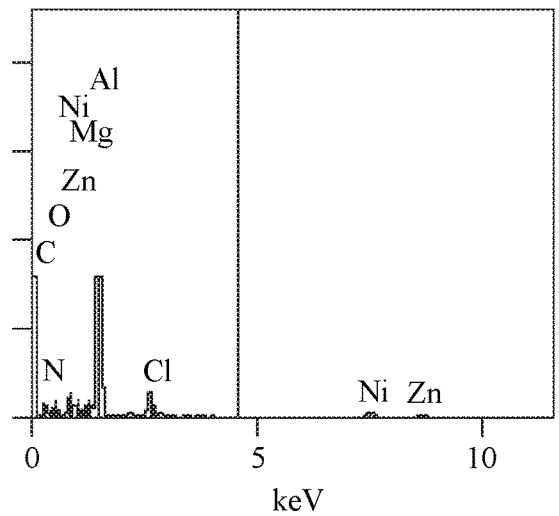
FIG. 7 shows an EDX electron microprobe analysis of the product of Example 4.

FIG. 7 shows an EDX electron microprobe analysis of the product of Example 4. As shown, the product contained both nickel and zinc, which is indicative of incorporation of nickel centers, either through direct appending to the ligand and/or exchange of at least portion of the zinc centers for nickel. Based on the observed peak areas, the molar ratio of Ni:Zn was approximately 2:1, indicating that some zinc in addition to that initially coordinated by the diimine binding site was exchanged for nickel.

Figure 8:
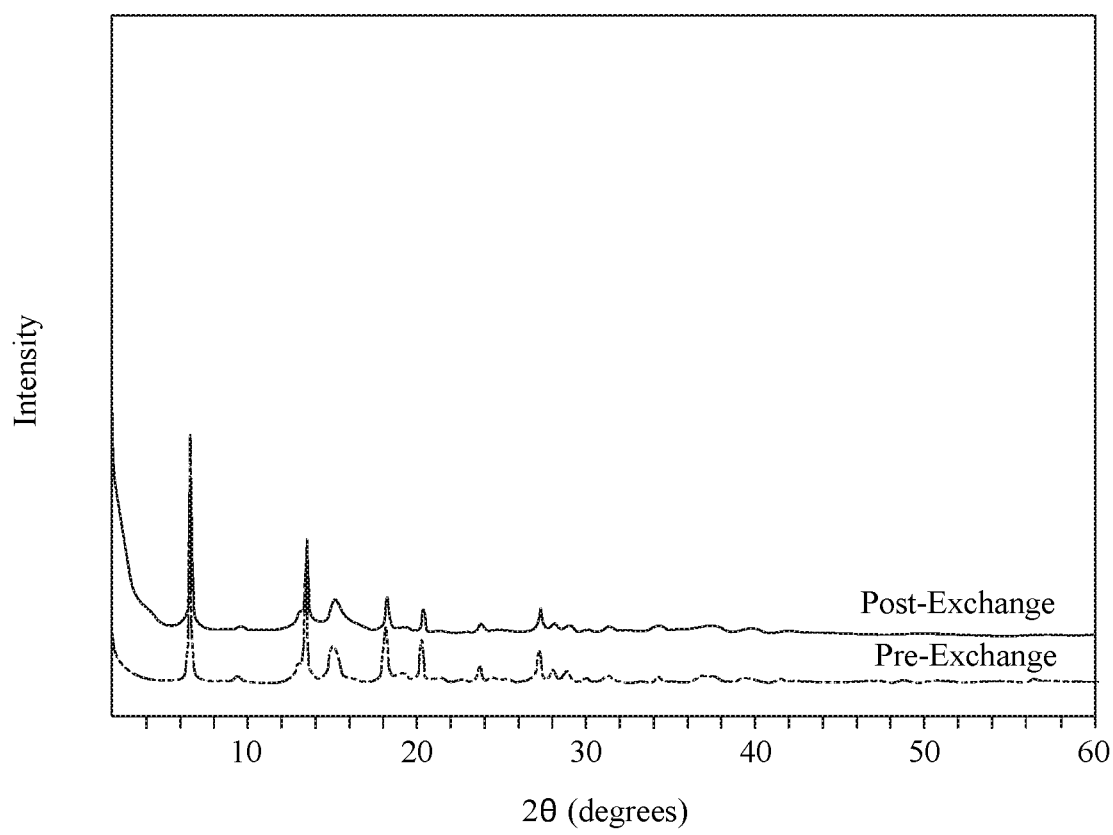
FIG. 8 shows comparative X-ray powder diffraction patterns for the products of Example 2A and Example 4.

FIG. 8 shows comparative X-ray powder diffraction patterns for the products of Example 2A and Example 4. As shown, there was minimal change in the crystallinity and structure of the product following nickel exchange.

Example 5: Ammonium Chloride Treatment and Product Characterization

The crystalline product of Example 2A (480 mg) was suspended in 50 mL methanol in a roundbottom flask. Variable amounts of ammonium chloride (750 mg dissolved in 2 mL water) were then combined with the methanol suspension with stirring. The ammonium chloride was combined with the crystalline product in the following amounts (wt. %) in the suspension: 25, 50, 75, 100, 110, 120, 130 and 140. The metal-organic framework material concentration was 5 mg/mL for all samples, except for the 140 wt. % sample, which utilized a metal-organic framework material concentration of 9 mg/mL. After adding the ammonium chloride solution, the reaction mixture was heated at reflux overnight. A gray-green solid product was isolated by filtration and washed with methanol. The product obtained in each instance was characterized by X-ray powder diffraction, attenuated total reflectance (ATR) infrared spectroscopy, and BET surface area measurements. Table 2 shows the peak/intensity table for a properly washed material from Example 5.

TABLE 2

Example 5

| 2θ (degrees) | Relative Intensity (%) |
|---|---|
| 6.0-7.25 | 100 |
| 9.0-10.0 | 0-10 |
| 12.5-14.0 | 5-15 |
| 13.5-14.25 | 0-5 |
| 14.0-15.0 | 0-5 |
| 17.0-18.5 | 0-5 |

Figure 9:
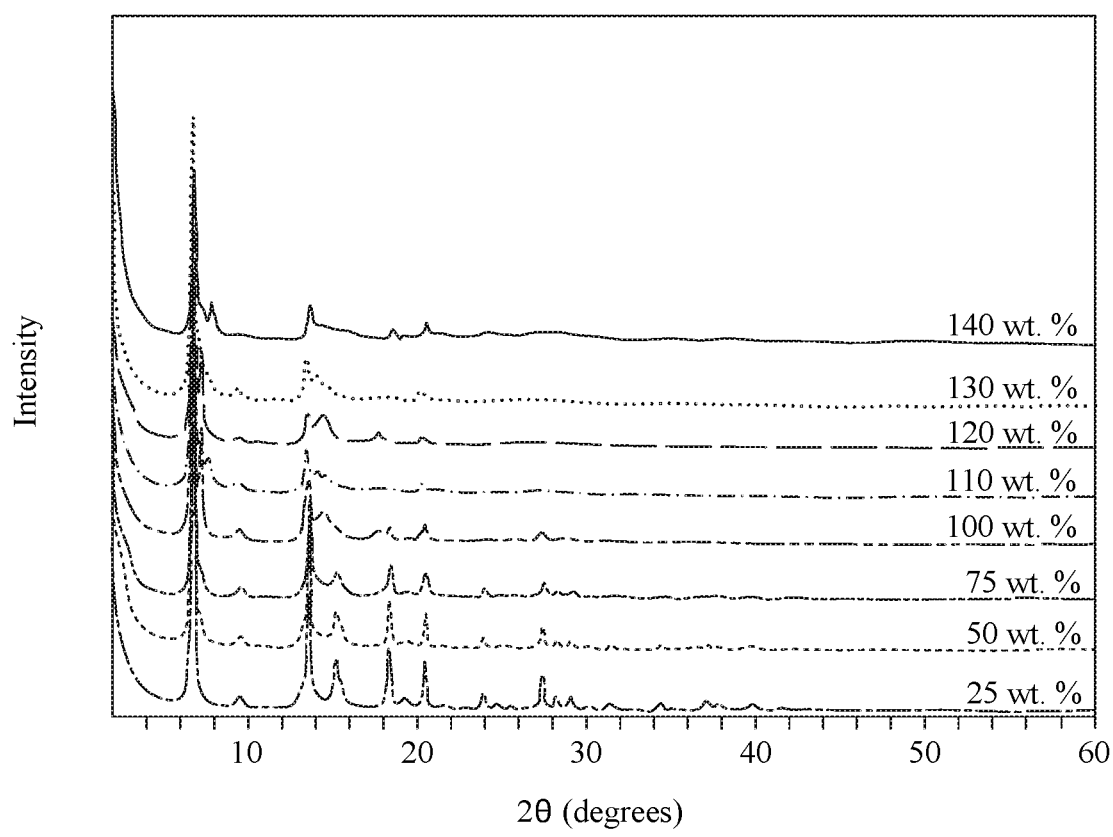
FIG. 9 shows comparative X-ray powder diffraction patterns for the product of Example 2A treated with various amounts of ammonium chloride.

FIG. 9 shows comparative X-ray powder diffraction patterns for the product of Example 2A treated with various amounts of ammonium chloride. As the amount of ammonium chloride was increased, particularly above 100 wt. %, the X-ray powder diffraction peaks underwent broadening, particularly for the peaks having 2θ values of about 16° or higher. The changes in the X-ray diffraction patterns are believed to arise from removal of 2,2-dimethylbutanoic acid from the structure of the metal-organic framework material, which is consistent with the ATR infrared spectroscopy analyses below. The 2,2-dimethylbenzoic acid may rigidify the structure and sharpen the X-ray powder diffraction peaks.

Figure 10:
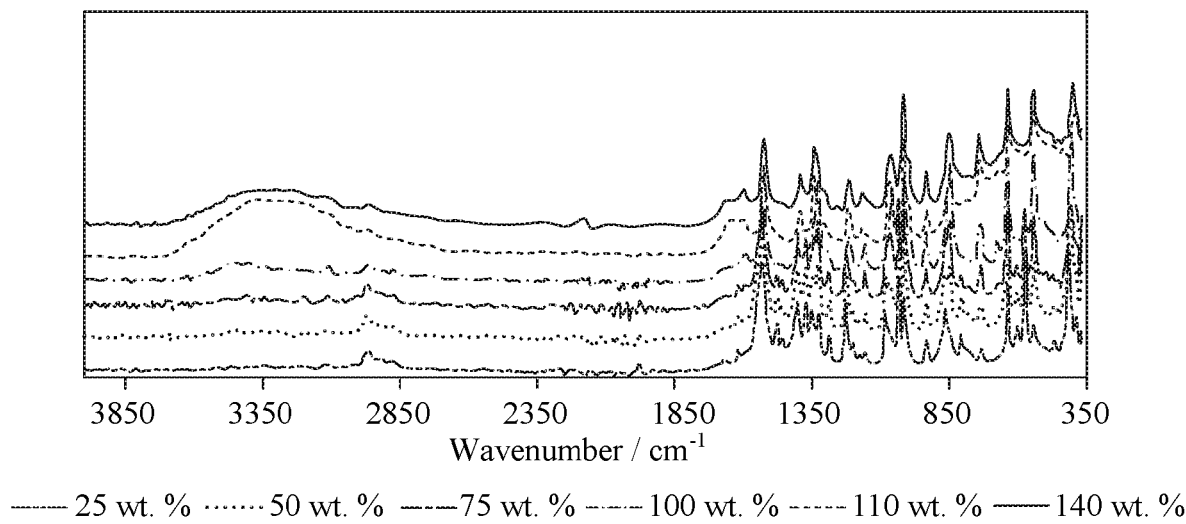
FIG. 10 shows comparative ATR infrared spectroscopy data for the product of Example 2A treated with various amounts of ammonium chloride.

FIG. 10 shows comparative ATR infrared spectroscopy data for the product of Example 2A treated with various amounts of ammonium chloride. As the amount of ammonium chloride was increased, the aliphatic C—H stretching peak centered at approximately 2900 $cm^{-1}$ decreased in intensity, which is consistent with removal of 2,2-dimethylbutanoic acid from the structure of the metal-organic framework material. In addition, the peak intensity decreased in the 1600 $cm^{-1}$ to 350 $cm^{-1}$ region. Simultaneously, the broad peak ingrowth between approximately 2900 $cm^{-1}$ to 3600 $cm^{-1}$ is consistent with increasing amounts of water becoming incorporated within the structure of the metal-organic framework material as 2,2-dimethylbutanoic acid molecules undergo displacement in the presence of increasing amounts of ammonium chloride.

Figure 11:
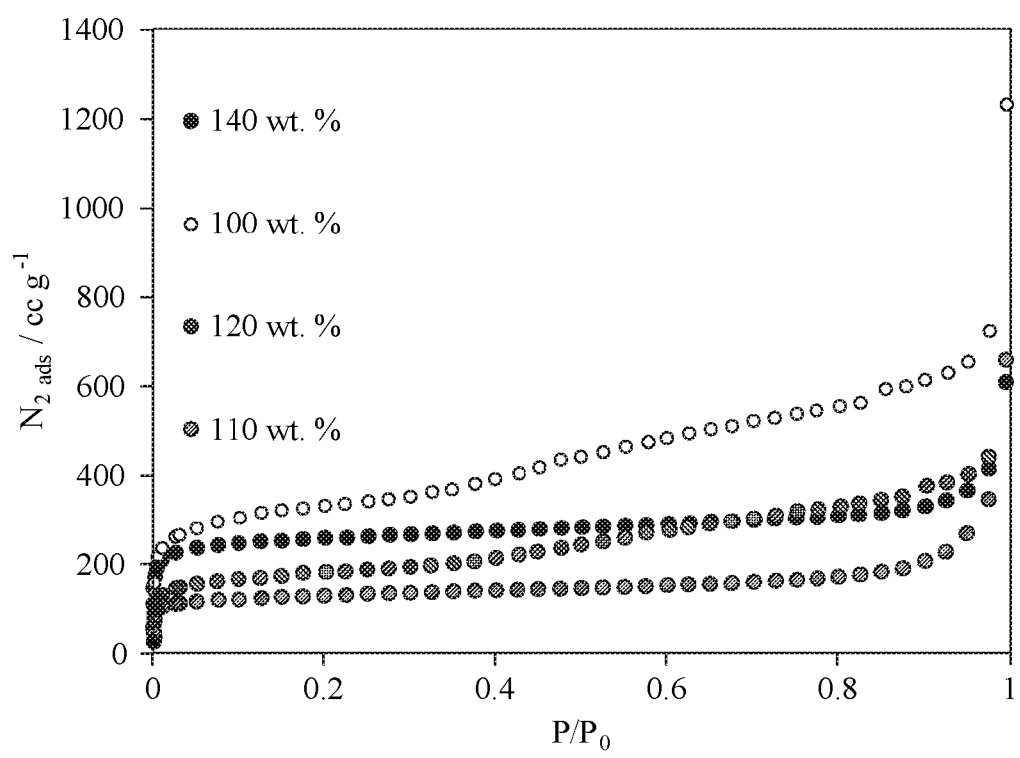
FIG. 11 shows comparative $N_2$ adsorption isotherms at 77 K for the product of Example 2A treated with various amounts of ammonium chloride.

FIG. 11 shows comparative $N_2$ adsorption isotherms at 77 K for the product of Example 2A treated with various amounts of ammonium chloride. Prior to analysis, the samples were outgassed at 180° C. under a dynamic vacuum of less than $1 \times 10^{-3}$ torr. As evidenced by the $N_2$ adsorption isotherms, the pore volume and surface area values generally increased following the ammonium chloride treatment, although the isotherm shapes exhibited considerable variability as the quantity of ammonium chloride was changed. With the varying isotherm shapes, there was also considerable variability in the pore volumes and surface area measurements as well. Isotherm variability may be minimized by conducting a methanol/water wash following the ammonium chloride wash (data not shown).

Example 6: Olefin Oligomerization

The nickel-exchanged product of Example 4 was used to promote olefin oligomerization in this example. DMBA may or may not be removed prior to forming the nickel-exchanged product. A slurry of the nickel-exchanged product (Example 4) was prepared by mixing 1-10 mg of the product in 2 mL toluene. In a separate glass vial, 0.5 mL methylalumoxane, 1 mL pentene, and adamantane (internal standard) were combined in 4 mL toluene. The nickel-exchanged product slurry was added to the alpha olefin solution, and the reaction mixture was stirred in an $N_2$-filled glovebox. The alpha olefin transformed to a mixture of cis- and trans-2-pentene under the reaction conditions. Approximately 5% dimerization to $C_{10}$ compounds also occurred under the reaction conditions.

Example 7: Synthesis of 5,5'-(((1E,2E)-ethane-1,2-diylidene)bis(azaneylylidene))bis(2-hydroxybenzoic acid)

25 grams of 5-aminosalicylic acid was suspended in 500 mL of ethanol and 11.8 grams of glyoxal (40 wt. % solution) was added. The reaction mixture was stirred overnight (~16 hours) at 50° C. The product was collected by filtration and washed with ethanol. The resulting orange solids were suspended in 300 mL of 0.1 M HCl and stirred for 10 minutes. The solids were collected by filtration and the acid washing was repeated again. After collecting the solids from the HCl solution by filtration, the solids were suspended in 200 mL of acetone. After stirring for 10 minutes, the solids were collected by filtration and allowed to dry on the filter paper.

Example 8: Reaction of a Diimine Salicylate Ligand with Zinc Acetate 500 mg of the product from Example 7 was added to a 200 mL roundbottom flask and 100 mL of 20% water in DMF added. To the solution was added 600 mg of zinc acetate dihydrate, and the reaction was allowed to stir at 60° C. Crystalline solids appeared within 30 minutes. The reaction was stirred from 2 to 16 hours. The solids were collected by filtration, washed with fresh DMF and then minimal ethanol to afford the metal-organic framework material.

Example 9: Reaction of a Diimine Salicylate Ligand with Cobalt Acetate or Nickel Acetate The procedure of Example 8 was repeated, except for replacing the zinc acetate dihydrate with nickel acetate hydrate or cobalt acetate.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A metal-organic framework material comprising:
   a plurality of metal centers, wherein the metal centers are selected from the group consisting of zinc, cobalt, and nickel; and
   a multidentate organic ligand coordinated to the plurality of metal centers via at least one binding site to define an at least partially crystalline network structure having a plurality of internal pores;

wherein the multidentate organic ligand is selected from the group consisting of

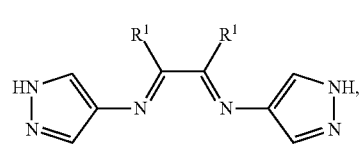

Formula 3A

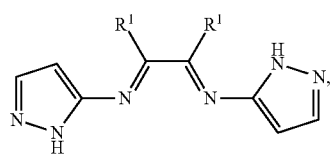

Formula 3B

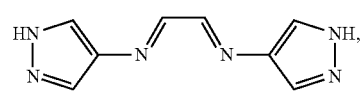

Formula 4

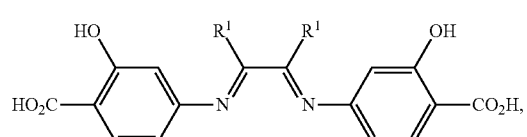

Formula 5A

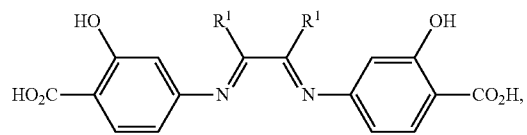

Formula 5B

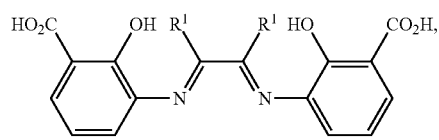

Formula 5C

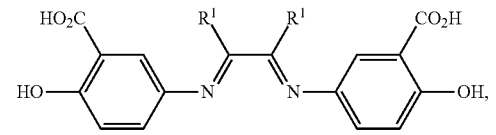

Formula 5D

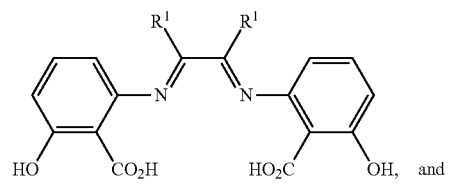

and

Formula 6

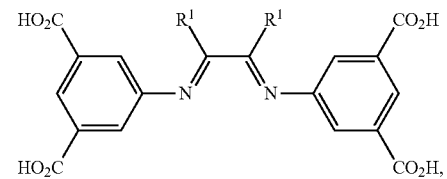

wherein $R^1$ is H.

2. The metal-organic framework material of claim 1, wherein the multidentate organic ligand comprises a pyrazole.

3. The metal-organic framework material of claim 1, wherein the multidentate organic ligand is N,N'-di(1H-pyrazol-4-yl)ethane-1,2-diimine.

4. The metal-organic framework material of claim 1, wherein at least a portion of the plurality of metal centers comprise a divalent metal.

5. The metal-organic framework material of claim 1, further comprising:
a residual ligand or a metal salt incorporated within at least a portion of the plurality of internal pores.

6. The metal-organic framework material of claim 1, wherein the the multidentate organic ligand comprises a salicylate or a 3,5-benzenedicarboxylate.

7. A metal-organic framework material comprising:
a plurality of divalent metal centers, wherein the divalent metal centers are selected from the group consisting of zinc, cobalt, and nickel; and
an N,N'-di(1H-pyrazol-4-yl)ethane-1,2-diimine multidentate organic ligand coordinated to the plurality of divalent metal centers via at least one binding site to define an at least partially crystalline network structure having a plurality of internal pores.

8. The metal-organic framework material of claim 7, wherein the divalent metal centers comprise zinc.

9. The metal-organic framework material of claim 7, further comprising:
a carboxylic acid or a salt thereof incorporated within at least a portion of the plurality of internal pores.

10. The metal-organic framework material of claim 7, further comprising:
a plurality of nickel centers coordinated to the N,N'-di(1H-pyrazol-4-yl)ethane-1,2-diimine multidentate organic ligand via at least one binding site.

11. The metal-organic framework material of claim 7, further comprising:
a ZnO impurity.

12. A metal-organic framework material comprising:
a plurality of divalent metal centers, wherein the divalent metal centers are selected from the group consisting of zinc, cobalt, and nickel; and
a 5,5'-(((1E,2E)-ethane-1,2-diylidene)bis(azaneylylidene))bis(2-hydroxybenzoic acid) multidentate organic ligand coordinated to the plurality of divalent metal centers via at least one binding site to define an at least partially crystalline network structure having a plurality of internal pores.

13. The metal-organic framework material of claim 12, wherein the divalent metal centers comprise zinc.

14. A method for forming a composition according to claim 1, the method comprising:
combining a metal source with a multidentate organic ligand comprising a first binding site and a second binding site that are bridged together with a third binding site, the third binding site comprising a diimine moiety that is a reaction product of glyoxal; and
reacting the metal source with the multidentate organic ligand to form a metal-organic framework material having an at least partially crystalline network structure with a plurality of internal pores defined therein and comprising a plurality of metal centers coordinated to at least one of the first binding site, the second binding site, or the third binding site,
wherein the metal centers are selected from the group consisting of zinc, cobalt, and nickel, and
wherein the multi-dentate organic ligand is selected from the group consisting of Formula 3A, Formula 3B, Formula 4, Formula 5A, Formula 5B, Formula 5C, Formula 5D, and Formula 6, where $R^1$ is H.

15. The method of claim 14, wherein the metal source is a preformed metal cluster.

16. The method of claim 15, wherein the preformed metal cluster comprises zinc.

17. The method of claim 15, wherein the preformed metal cluster comprises $Zn_4O(2,2\text{-dimethylbutanoate})_6$.

18. The method of claim 15, wherein at least a portion of the plurality of internal pores contain a residual ligand or a metal salt.

19. The method of claim 18, further comprising:
thermally or chemically removing the residual ligand or the metal salt from the plurality of internal pores.

20. The method of claim 14, wherein the multidentate organic ligand comprises a pyrazole.

21. The method of claim 14, wherein the multidentate organic ligand is N,N'-di(1H-pyrazol-4-yl)ethane-1,2-diimine.

22. The method of any one of claim 14, wherein an acid is combined with the metal source when forming the metal-organic framework material.

23. The method of claim 14, further comprising:
exchanging at least a portion of a first metal comprising the plurality of metal centers for a second metal, the second metal selected from the group consisting of zinc, cobalt, and nickel.

24. A method for forming a composition according to claim 7, the method comprising:
combining a metal source with a multidentate organic ligand comprising N,N'-di(1H-pyrazol-4-yl)ethane-1,2-diimine; and
reacting the metal source with the multidentate organic ligand to form a metal-organic framework material having an at least partially crystalline network structure with a plurality of internal pores defined therein and comprising a plurality of metal centers coordinated to the multidentate organic ligand at one or more binding sites,
wherein the metal centers are divalent metal centers selected from the group consisting of zinc, cobalt, and nickel.

25. The method of claim 24, wherein the metal source comprises a preformed metal cluster.

26. The method of claim 25, wherein the preformed metal cluster comprises Zn.

27. The method of claim 25, wherein the preformed metal cluster comprises $Zn_4O(2,2\text{-dimethylbutanoate})_6$.

28. The method of claim 25, wherein at least a portion of the internal pores contain a residual ligand or a metal salt.

29. The method of claim 28, further comprising:
thermally or chemically removing the residual ligand or the metal salt from the plurality of internal pores.

30. The method of claim 24, wherein the metal source comprises zinc oxide, zinc acetate, or basic zinc carbonate.

31. The method of claim 30, wherein the metal source comprises zinc oxide and an acid is combined with the metal source when forming the metal-organic framework material.

32. The method of claim 24, further comprising:
exchanging at least a portion of a first metal comprising the plurality of metal centers for a second metal, the second metal being selected from the group consisting of zinc, cobalt, and nickel.

33. The method of claim 24, wherein the first metal is zinc and the second metal is nickel.

34. A method for forming a composition according to claim 12, the method comprising:
combining a metal source with a multidentate organic ligand comprising 5,5'-(((1E,2E)-ethane-1,2-diylidene)bis(azaneylylidene))bis(2-hydroxybenzoic acid); and
reacting the metal source with the multidentate organic ligand to form a metal-organic framework material having an at least partially crystalline network structure with a plurality of internal pores defined therein and comprising a plurality of metal centers coordinated to the multidentate organic ligand at one or more binding sites, wherein the metal centers are divalent metal centers selected from the group consisting of zinc, cobalt, and nickel.

35. The method of claim 34, wherein the metal source comprises a metal selected from the group consisting of cobalt, nickel, zinc, and any combination thereof.

36. The method of claim 34, wherein the metal source comprises zinc.

37. A method comprising:
providing a catalyst precursor comprising a reaction product of N,N'-di(1H-pyrazol-4-yl)ethane-1,2-diimine and a preformed zinc cluster, ZnO, or basic zinc carbonate, the reaction product being a metal-organic framework material according to claim 12 having an at least partially crystalline network structure with a plurality of internal pores defined therein and comprising a plurality of metal centers comprising zinc coordinated to at least one binding site in the N,N'-di(1H-pyrazol-4-yl)ethane-1,2-diimine;

exposing the catalyst precursor to an activator to form an activated catalyst; contacting the activated catalyst with an olefin; and oligomerizing the olefin while the olefin contacts the activated catalyst.

38. The method of claim 37, wherein at least a portion of the metal centers have zinc exchanged for a catalytically active metal, wherein the catalytically active metal comprises Ni(II).

39. The method of claim 37, wherein the activator comprises an alumoxane.

* * * * *